Figure 9:
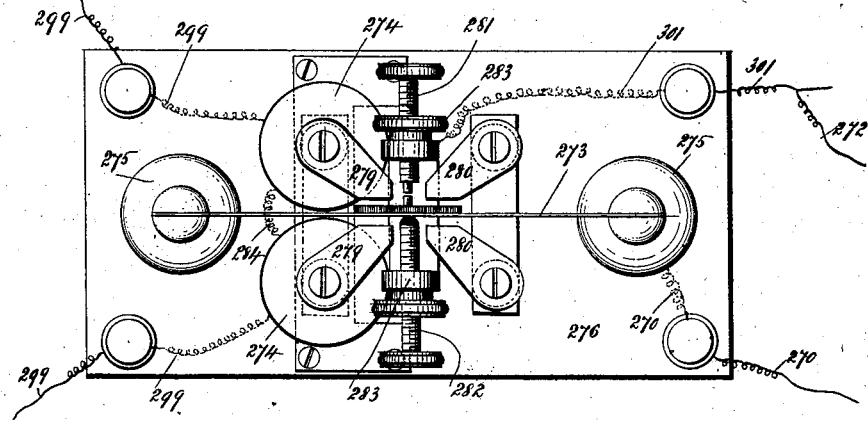

No. 721,202. PATENTED FEB. 24, 1903.
E. E. KLEINSCHMIDT.
FACSIMILE TELEGRAPH.
APPLICATION FILED FEB. 7, 1900.
NO MODEL. 13 SHEETS—SHEET 1.
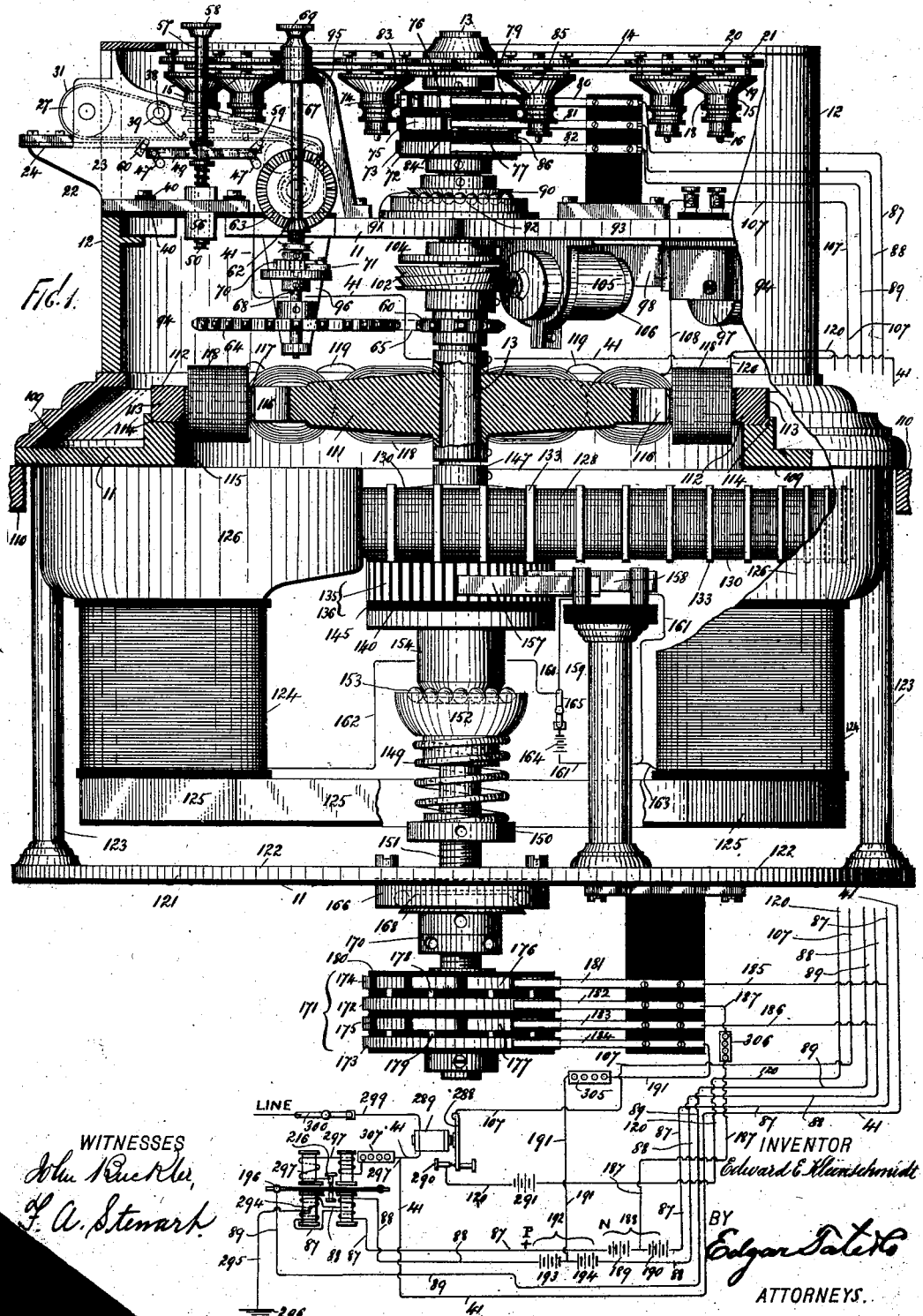

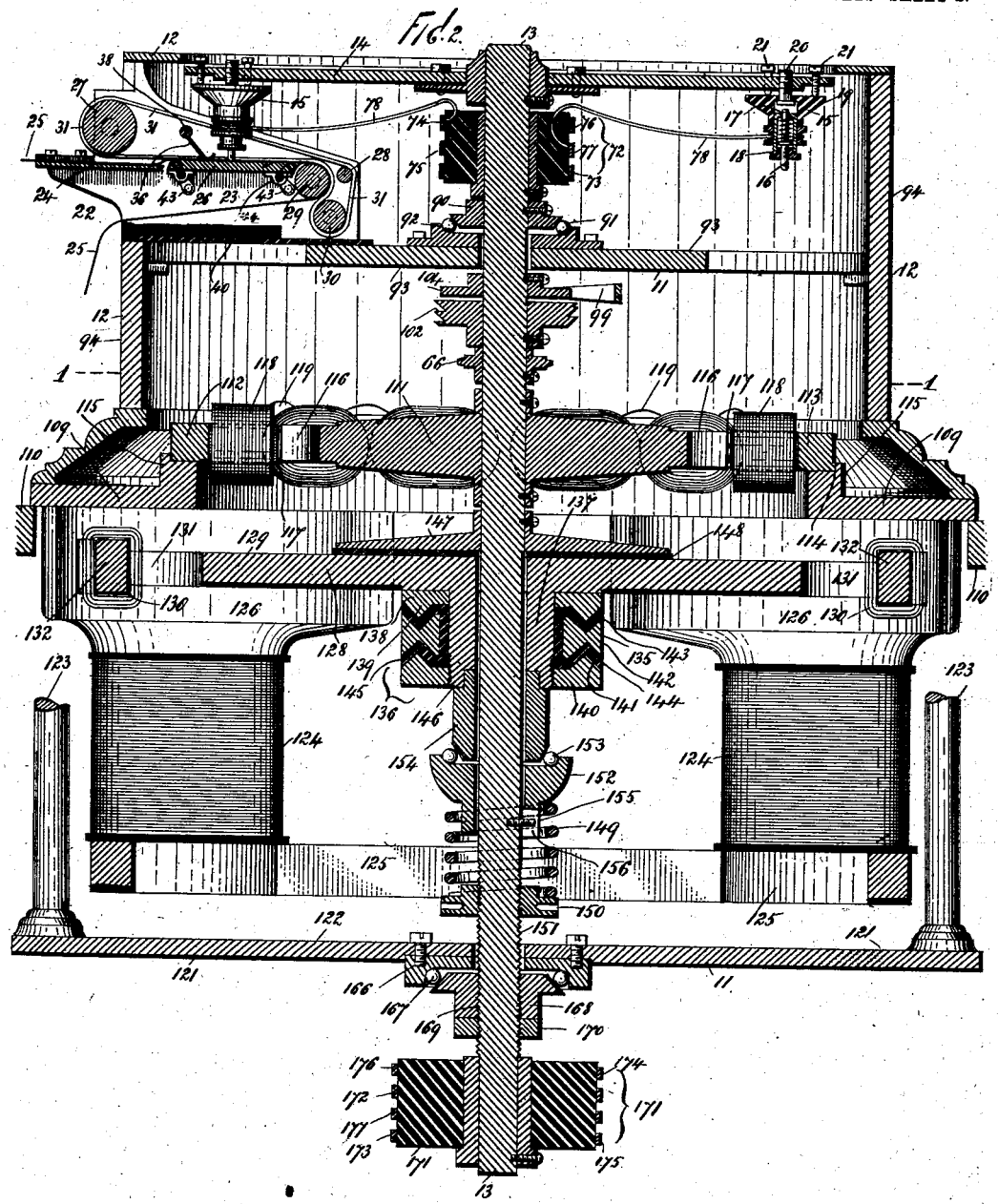

No. 721,202. PATENTED FEB. 24, 1903.
E. E. KLEINSCHMIDT.
FACSIMILE TELEGRAPH.
APPLICATION FILED FEB. 7, 1900.
NO MODEL. 13 SHEETS—SHEET 3.
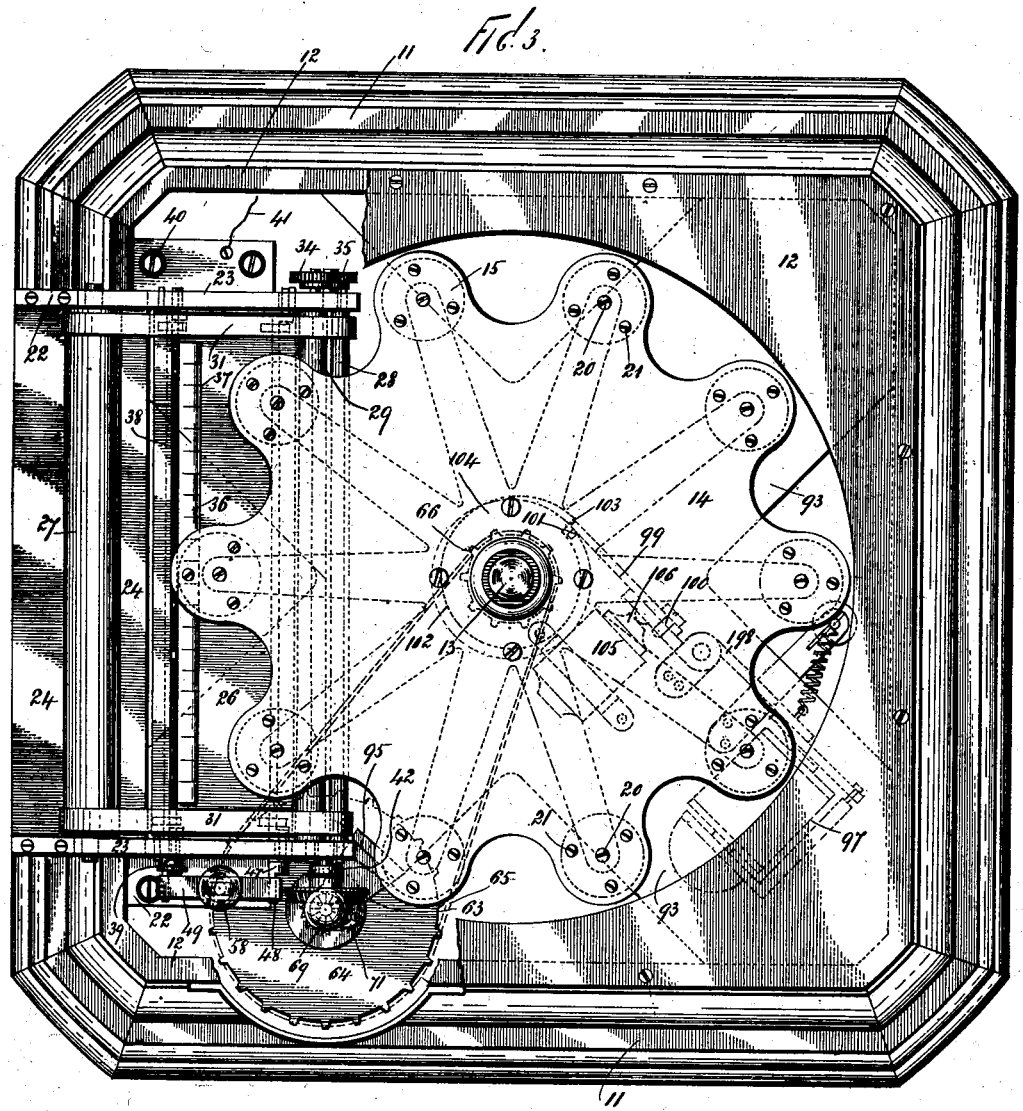
WITNESSES
INVENTOR
Edward E. Kleinschmidt
BY
Edgar Taledo
ATTORNEYS

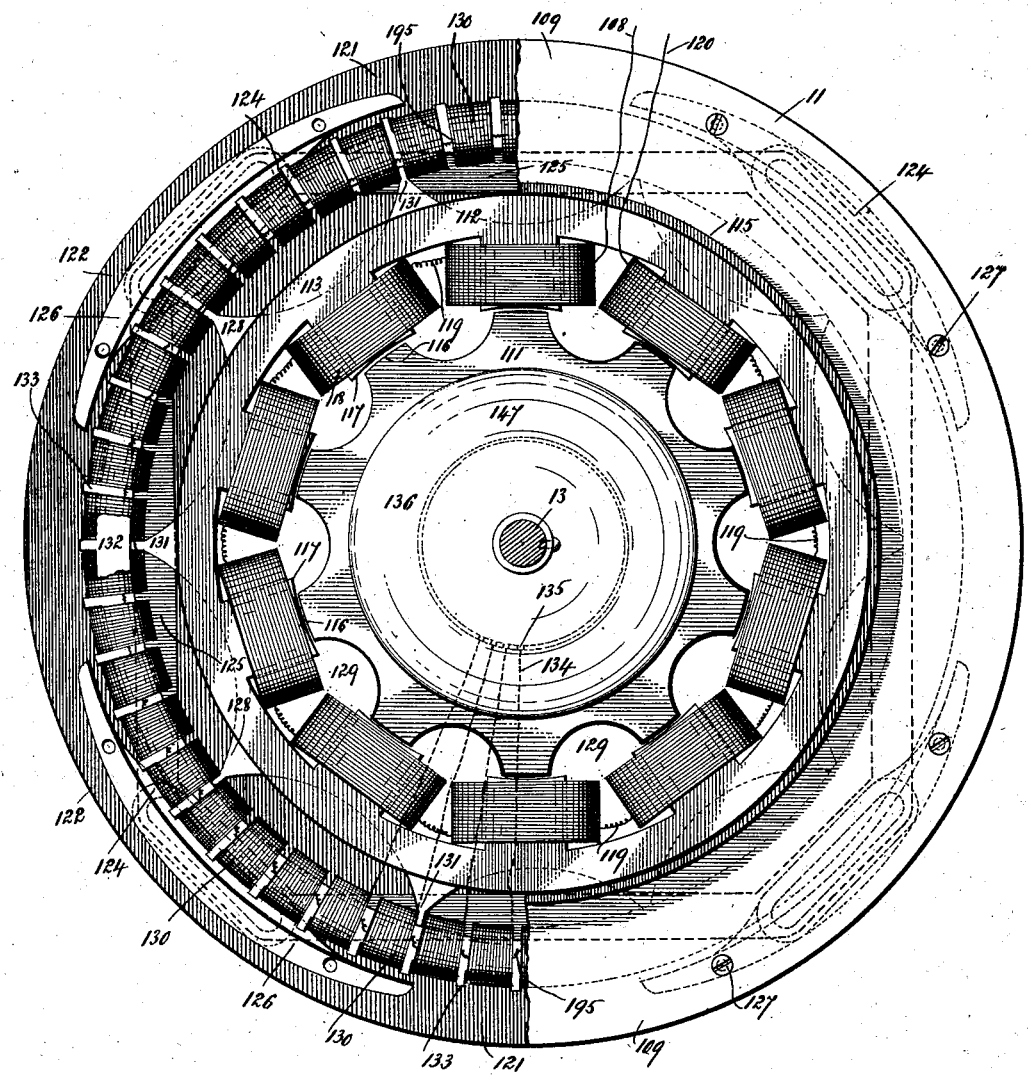

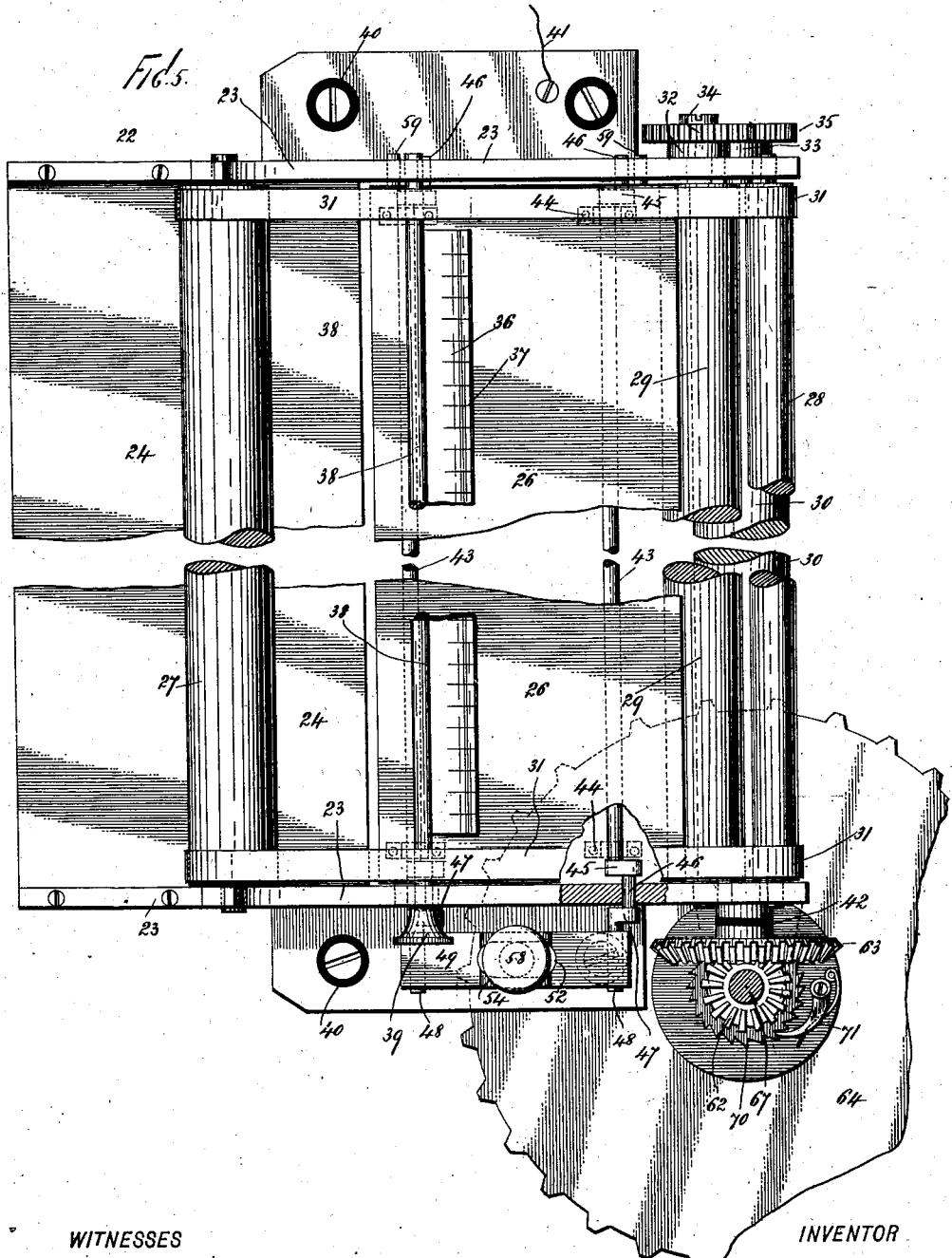

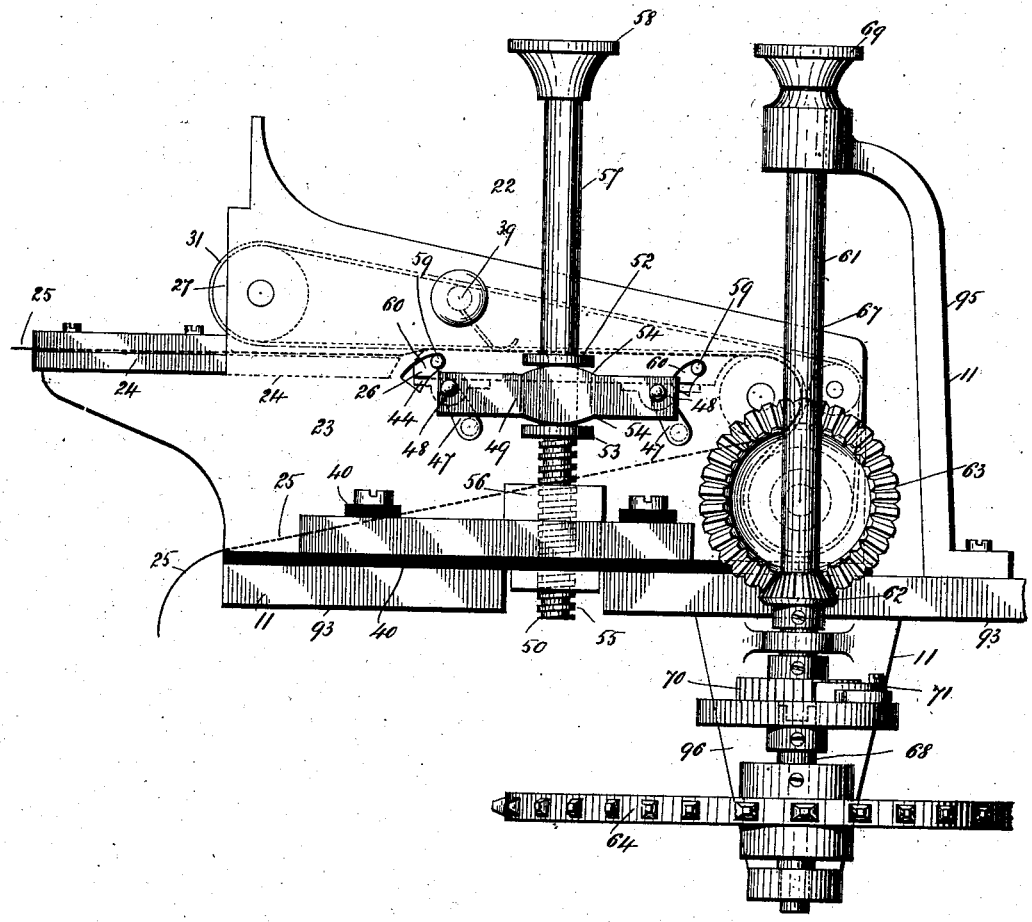

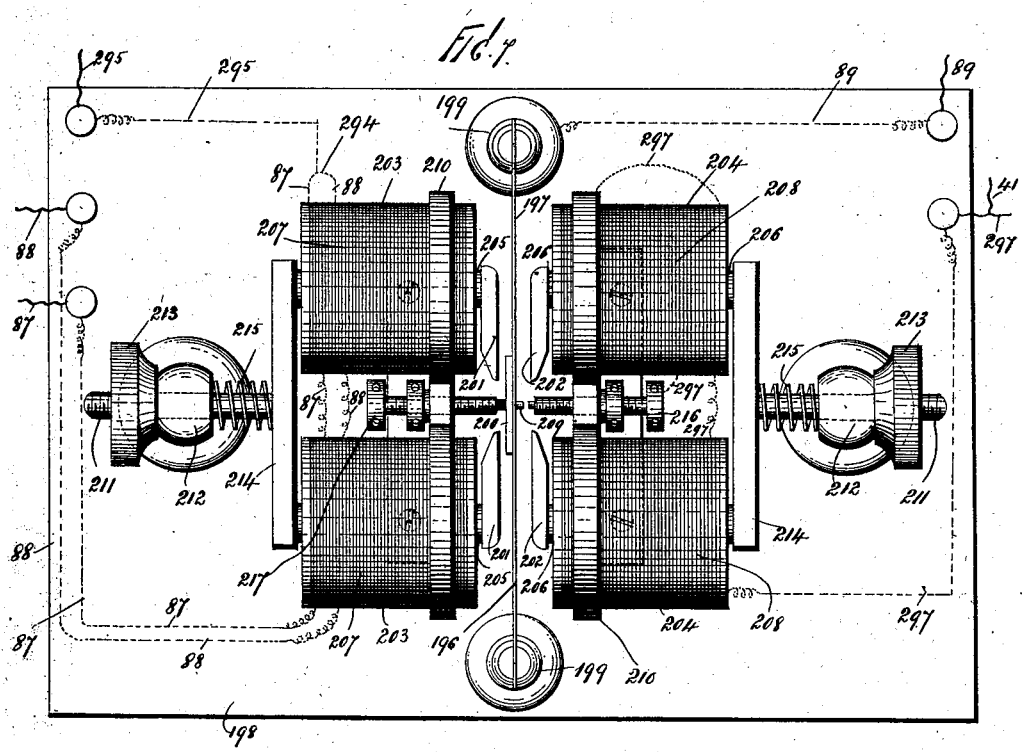
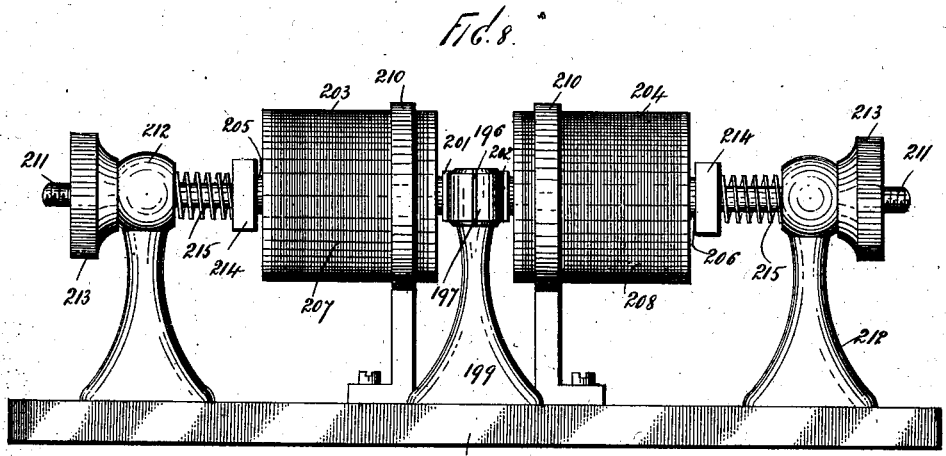

No. 721,202. PATENTED FEB. 24, 1903.
E. E. KLEINSCHMIDT.
FACSIMILE TELEGRAPH.
APPLICATION FILED FEB. 7, 1900.

NO MODEL. 13 SHEETS—SHEET 8.

WITNESSES
John Buckler,
F. A. Stewart

INVENTOR
Edward E. Kleinschmidt,
BY
Edgar Tate & Co
ATTORNEYS.

No. 721,202. PATENTED FEB. 24, 1903.
E. E. KLEINSCHMIDT.
FACSIMILE TELEGRAPH.
APPLICATION FILED FEB. 7, 1900.
NO MODEL. 13 SHEETS—SHEET 9.
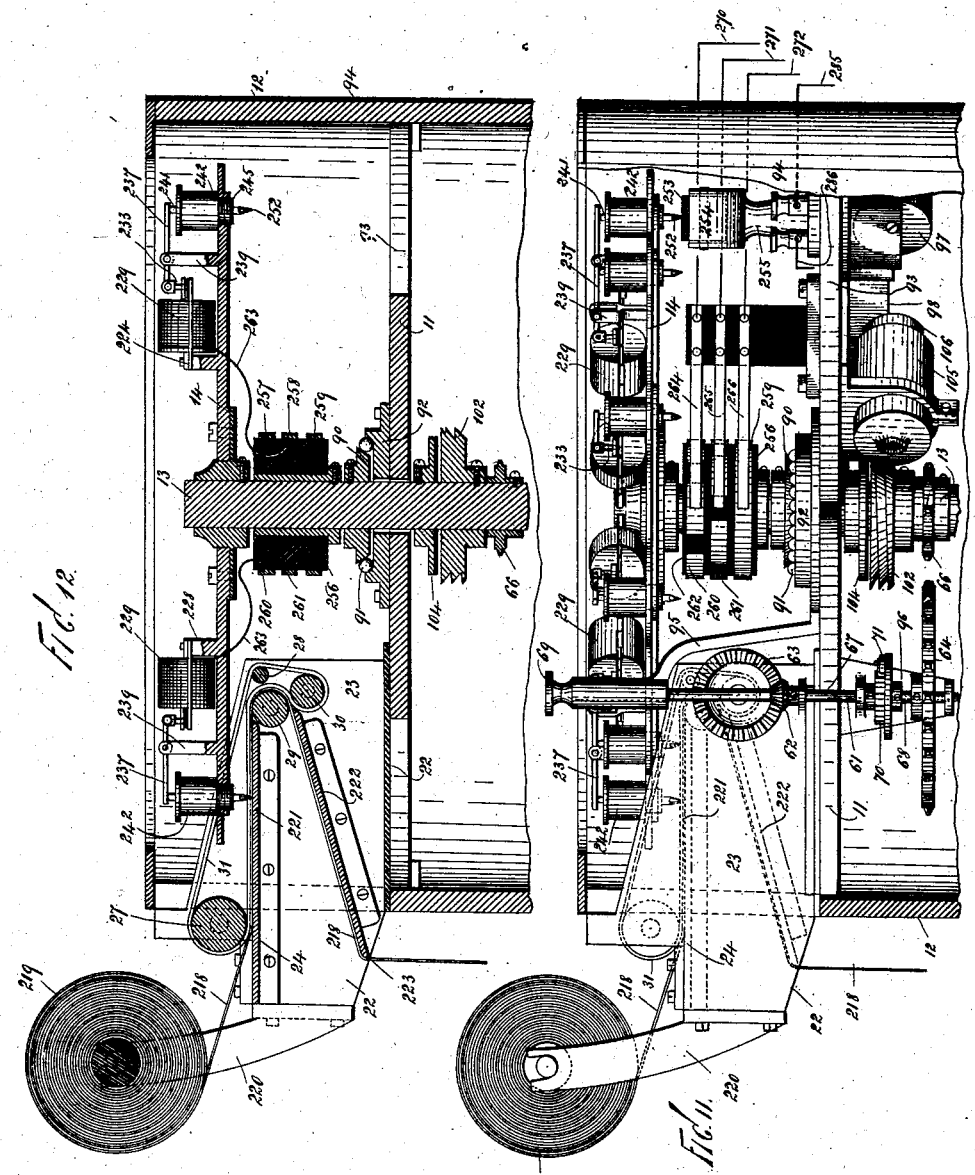
WITNESSES
INVENTOR
Edward E. Kleinschmidt
BY
Edgar Tate
ATTORNEYS No. 721,202. PATENTED FEB. 24, 1903.
E. E. KLEINSCHMIDT.
FACSIMILE TELEGRAPH.
APPLICATION FILED FEB. 7, 1900.
NO MODEL. 13 SHEETS—SHEET 10.
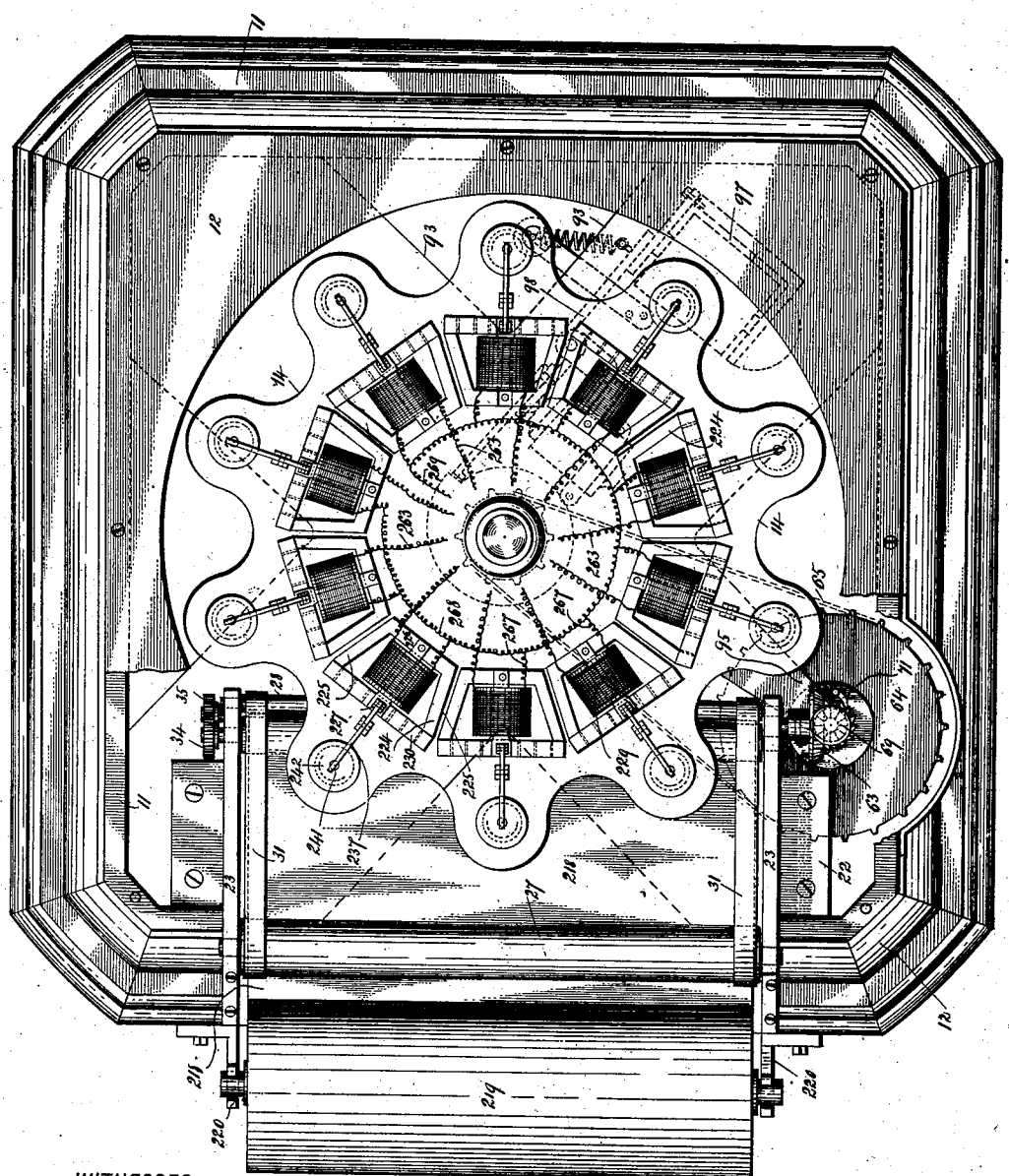

No. 721,202. PATENTED FEB. 24, 1903.
E. E. KLEINSCHMIDT.
FACSIMILE TELEGRAPH.
APPLICATION FILED FEB. 7, 1900.
NO MODEL. 13 SHEETS—SHEET 11.

No. 721,202. PATENTED FEB. 24, 1903.
E. E. KLEINSCHMIDT.
FACSIMILE TELEGRAPH.
APPLICATION FILED FEB. 7, 1900.
NO MODEL. 13 SHEETS—SHEET 12.
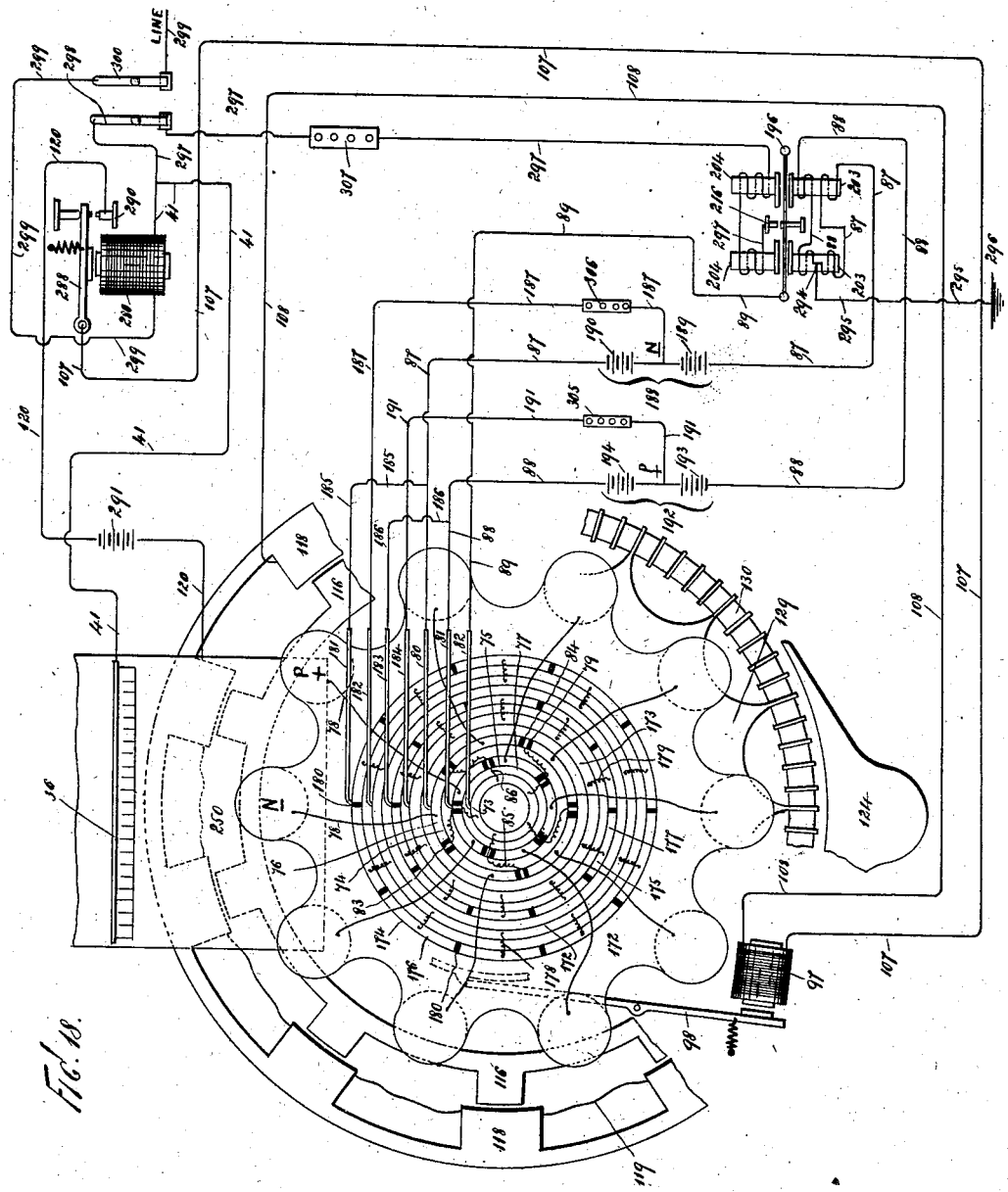
WITNESSES
INVENTOR
Edward E. Kleinschmidt
BY
Edgar Saler
ATTORNEYS No. 721,202. PATENTED FEB. 24, 1903.
E. E. KLEINSCHMIDT.
FACSIMILE TELEGRAPH.
APPLICATION FILED FEB. 7, 1900.
NO MODEL. 13 SHEETS—SHEET 13.

WITNESSES
John Buckler,
F. A. Stewart

INVENTOR
Edward E. Kleinschmidt
BY
Edgar Tate & Co.
ATTORNEYS

United States Patent Office.

EDWARD E. KLEINSCHMIDT, OF NEW YORK, N. Y., ASSIGNOR TO FREDERICK KLEINSCHMIDT, OF NEW YORK, N. Y.

FACSIMILE-TELEGRAPH.

SPECIFICATION forming part of Letters Patent No. 721,202, dated February 24, 1903.

Application filed February 7, 1900. Serial No. 4,368. (No model.)

*To all whom it may concern:*

Be it known that I, EDWARD E. KLEINSCHMIDT, a citizen of the United States, residing at New York, in the county of New York and State of New York, have invented certain new and useful Improvements in Facsimile-Telegraphs, of which the following is a full and complete specification, such as will enable those skilled in the art to which it appertains to make and use the same.

This invention relates to that class of telegraphic mechanism or apparatus which is generally known by the term "facsimile-telegraph" and which is designed for the transmission in facsimile of manuscript messages or pictures or other matter which is written or drawn upon a sending blank or sheet.

My invention has particular relation to facsimile-telegraphs which embody in the transmitting machine or apparatus a stylus mechanism which contacts with a metal-foil sheet on which the matter to be transmitted is written or drawn with an insulating-ink, the contact of the stylus device with said insulated portions being arranged and adapted to send an impulse over the line and cause a corresponding actuation of an electromagnet stylus device comprised in the receiving machine or apparatus, whereby the recording stylus mechanism will operate to mark or record in facsimile the matter thus transmitted.

The object of my invention is to produce an improved facsimile-telegraph in which perfect synchronism between the sending and receiving machines will be continuously maintained, which will operate continuously without occasion for frequent stoppage of the machines for the application or insertion of new matter to be transmitted, which by continuous operation will rapidly transmit a large amount or area of matter, which will be exceedingly simple in construction and mechanism and rapid and effective in operation, and which will attain a maximum degree of economy and convenience in use.

Figure 10:
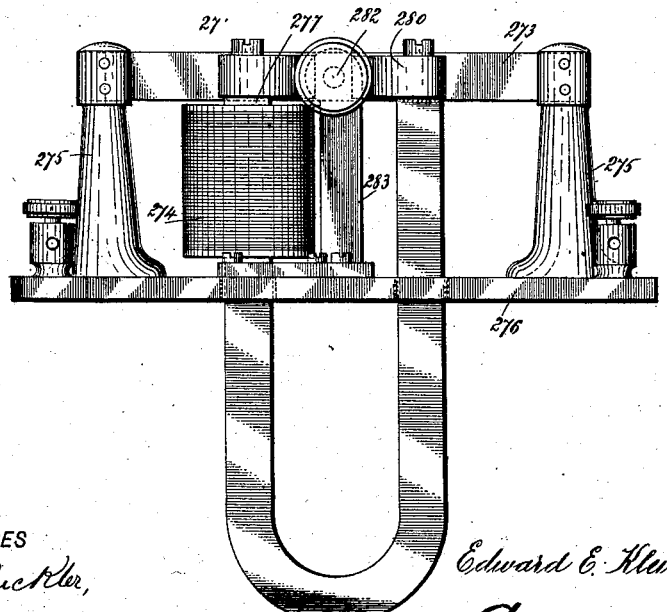
Figure 19:
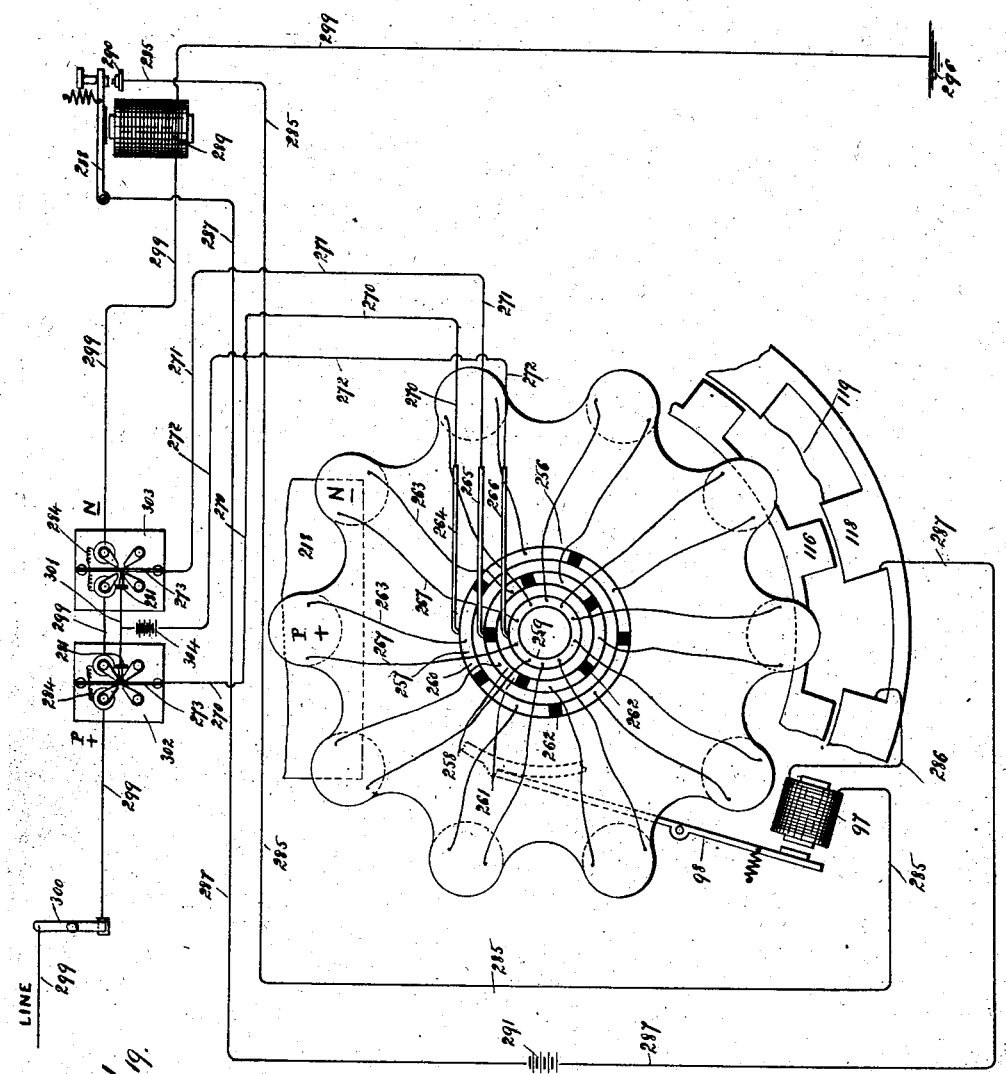

In the accompanying drawings, forming a part of this specification, in which like numerals of reference denote corresponding parts in the several views, Figure 1 is a general side elevation, partly in section and with parts of the inclosing casing broken away, illustrating the transmitting machine or apparatus embodied in my invention. Fig. 2 is a vertical transverse sectional view, taken from front to rear, of the transmitting-machine. Fig. 3 is a top or plan view of the transmitting-machine, parts of the top of the casing being broken away. Fig. 4 is a horizontal sectional view taken through the transmitting-machine on the line 1 1 of Fig. 2, parts being broken away to better show the underlying structure. Fig. 5 is a detail top or plan view illustrating the message-paper-feed mechanism of the transmitting-machine. Fig. 6 is a detail side view of the feed mechanism illustrated in Fig. 5. Fig. 7 is a detail top or plan view of the "stylus short-circuiter" for the transmitting-machine. Fig. 8 is a detail side view of said stylus short-circuiter. Fig. 9 is a detail top or plan view illustrating one of the polarized receiving-relays which are comprised in the line-circuit and arranged at the receiving or recording machine. Fig. 10 is a detail side view of said polarized relay. Fig. 11 is a side elevation, partly in section and partly broken away, of the top portion of the receiving-machine embodied in my invention. Fig. 12 is a vertical transverse sectional view taken from front to rear of the top portion of the receiving-machine. Fig. 13 is a top or plan view of the receiving-machine, parts of the top of the casing being broken away. Fig. 14 is a detail plan view illustrating one of the recording stylus devices. Fig. 15 is a detail end elevation of one of the recording stylus devices looking toward the armature. Fig. 16 is a detail vertical sectional view of one of the recording-styluses. Fig. 17 is a diagrammatic plan view illustrating the general theory of the circuits. Fig. 18 is a general diagrammatic plan view illustrating the complete circuits of the transmitting-machine and the connection thereof with the single line-wire, and Fig. 19 is a corresponding diagrammatic plan view illustrating the complete circuits of the receiving-machine and the connection thereof with the single line-wire.

Referring to the drawings, 11 designates a suitable framework which may be in the main of any required or adapted construction, to which is suitably connected a casing 12, arranged to inclose the operative mechanism and of convenient or adapted construction for this purpose. A main vertical shaft 13 is centrally mounted within the framework and casing and carries at its top end in its revoluble movement the stylus-carrier 14, which may be a plate, as herein shown, or a web-frame or other suitable or adapted structure. The stylus-carrier 14 is mounted in fixed relation upon the main shaft 13.

I will now proceed to more specifically describe the features of construction which appertain particularly to the transmitting machine or apparatus.

In the transmitting-machine the stylus-carrier 14 carries a series of transmitting stylus devices 15, which depend or project downwardly from the carrier and are arranged in a circular series at the peripheral portion of the latter. I may employ any suitable or desired number of such stylus devices; but in the present instance I have illustrated a set of ten, the relative construction and arrangement being such that two or a pair of the stylus devices will be simultaneously in operative position upon the metal-foil-paper sheet or blank at all times during the transmission of the matter upon said blank. The stylus devices are preferably equidistantly placed, and in the practical structure of the machine, as herein illustrated, three of said stylus devices may be simultaneously upon the foil-paper, (see Fig. 3;) but only two or a pair of such devices are in operative connection. The arrangement of a plurality of styluses in a circular series upon a revolving plate or series carrier and the operative arrangement and connection whereby a plurality of such styluses are simultaneously in operative position enables a materially greater speed in the transmitting operation of the apparatus, as will be readily understood. I may by variation or modification, which will be perfectly manifest from the present specification, employ a greater or less number of styluses than is herein illustrated.

The transmitting stylus devices 15 comprise a stylus contact-point 16 and may be in the main of any suitable or adapted construction. I prefer, however, to employ a specific construction of stylus, which involves a yielding stylus-rod 17, carried within a cylindrical casing 18, having a broad-top disk 19, centrally secured by an adjustable screw 20 to the carrier-plate 14, and having a series of adjusting-screws 21 projecting from said member 14 and bearing against the disk 19 at points beyond the central screw 20, whereby said stylus device may be adjusted vertically, and is also subject to adjustment laterally or in a horizontal plane.

The feed mechanism for effecting the carriage and continuous feed of the foil-paper message sheet or blank is arranged at the front and top portion of the framework and casing with relation to the line of travel of the transmitting stylus devices 15 and beneath the latter, so that the stylus-points 16 will describe an arc or segmental line of travel over the surface of the foil-paper and in contact with the same. This paper-feed mechanism comprises a suitable framework 22, which is preferably individual or separate with relation to the general framework of the machine and embodies vertical parallel sides 23 23, between which is sustained and carried the feeding mechanism. The framework 22 is mounted and secured upon the general framework 11, and between its sides 23 at the front extends a horizontal table or platform 24, over which the foil-paper (represented at 25) initially passes to a platen 26, arranged in rear of the table 24 and extending in the plane of the arc or line of travel of the styluses. Between the sides 23, above the table 24, is mounted a roller 27, and at the rear end of said framework 22 and between the sides thereof is mounted an idler or roller 28, in front of which is mounted another roller 29, and beneath said roller 29 is mounted another roller 30. At each side of the feed mechanism are arranged elastic bands or tapes 31, the office of which is to carry the message paper or blank 25 in a positive movement over the platen 26. These elastic bands pass around the front of the roller 27 and beneath the same and rearwardly above the table 24 and over the top of the platen 26, thence around the rear side of the roller 29 and downwardly between said roller 29 and the roller 30, thence in front of and under the roller 30 and rearwardly up to and around the rear side of the roller 28, and thence forwardly up and over the top of the roller 27 and around the front of the same. Said bands are continuous or endless and travel continuously in the line of movement just indicated. The rollers 29 and 30 have shaft extensions, as at 32 and 33, respectively, at one end, which respectively carry gears 34 and 35, which intermesh, whereby the revolution of the roller 30 (which is the main roller from which the feed mechanism derives its operation or movement) is communicated to the roller 29 for the purpose of insuring a more positive feed of the bands 31 and the foil-paper 25 by action of said roller 29.

I employ a brush contact device which is adapted to contact with or bear upon the foil surface of the message-paper 25, and while this contact device may be of any suitable or adapted construction I prefer to employ the brush device as comprised in my above-mentioned other application for patent and as herein illustrated, which comprises a flexible metallic brush 36, extending transversely across and over the platen 26 and having its lower contact edge curved and provided with a series of parallel slits, as at 37, for the purpose of increasing its flexibility, said brush-plate 36 being carried upon a rod or shaft 38, bearing in the sides 23 of the feed-mechanism framework and adjustable by means of a thumb-nut, as at 39, whereby by operating said thumb-nut and turning the rod 38 the brush may be turned to adjust its contact edge in a vertical plane to govern its pressure or contact with relation to the foil-paper. The whole paper-feed-mechanism frame may be insulated from the main frame 11, as shown at 40, so that the whole of said framework 22 will be comprised in an electric circuit, the circuit connection being made by means of a wire, as indicated at 41; but under some circumstances only the foil-paper contact brush device need be comprised in circuit, in which case the wire connection 41 will be made direct to said brush device and the latter will be properly insulated from the main framework of the paper-feed mechanism. When the whole feed-mechanism framework 22 is comprised in circuit, as herein illustrated, the insulation is completed by means of an insulated section, as at 42, upon the shaft of the roller 30, which shaft is in connection with the main operative mechanism of the machine.

The platen 26 is adjustable vertically with relation to the degree of projection of the stylus-point 16, whereby the contact between the stylus and the foil surface of the message-paper 25 may be suitably adjusted or governed as desired to insure a perfect degree of contact and perfect operation. This vertical adjustment of said platen is independent of the general paper-feed mechanism and is preferably accomplished by means of the following construction: The platen is mounted upon and carried by two transverse angular rock-shafts 43 43, by the operation of which the platen can be adjusted upwardly and downwardly between the sides 23 of the paper-feed-mechanism frame 22 in such a manner that it will always maintain a uniform position on a horizontal plane. These shafts 43 are preferably respectively arranged at the front and rear portions of the platen, so that their straight main portions extend transversely beneath the latter and operate in bearings 44 at the under side of the same. Each outer end of the shafts 43 is provided with a crank-arm 45, the outer end or pin 46 of which bears in the side 23 of the frame 22. At one side of the feed mechanism the ends 46 of said shafts 43 are provided, outside the side 23, with supplementary crank-arms 47, the outer ends or pins 48 of which have bearings in the respective ends of a vertically-adjustable connecting-block or cross-piece 49, arranged on a plane parallel with relation to the platen 26. This block 49 is adapted to be moved or adjusted vertically by means of a screw 50, extending vertically and passing centrally through said block, the central opening 51 in said block through which the stem of the screw passes being elongated on a longitudinal plane, as indicated in Fig. 5, to permit of the requisite sliding movement of said block 49 in a lateral plane with respect to the screw 50 during the operation of the crank-shaft connection extending between said adjusting-block and the platen. Said screw carries flanges 52 and 53, respectively, at a point above and below the block 49, which flanges bear against a convex central surface 54 at the top and bottom of the block and operate to raise or lower the latter during the adjustment of the screw in a vertical plane. The portion of the screw 50 below the lower flange 53 is threaded, as at 55, which threaded portion operates in a block or portion, as at 56, comprised in the general framework 22, while above the upper flange 52 the stem of the screw is extended a suitable distance, as at 57, and provided with an operating head or knob 58, by which it may be conveniently turned. In the practical construction of the platen-adjusting mechanism, as just described, the inner crank-arms 45 of the shafts 43 extend in an inclined direction downwardly and rearwardly, while the outer crank-arms 47 of said shafts extend in an inclined direction upwardly and forwardly, whereby the platen will be swung in an upward and rearward or downward and forward direction during its adjustment, but will be maintained in a proper horizontal plane at all periods of its adjustable movement.

Any suitable or adapted means for operating the block 49 in its vertical movement may be employed, if desired, in lieu of the screw 50. I prefer to employ means for further guiding the platen in its adjustment and for maintaining the same in positive position at its points of adjustment, which means may consist of pins or studs 59, projecting laterally from the side edges of the platen (there being two at each side, respectively arranged near the front and rear) and entering slots 60 in the frame sides 23, which slots are segmental or curved, preferably enlarged or widened toward their lower ends, and extend downwardly and forwardly, as clearly represented in Fig. 6. The particular office performed by these guide pins and slots is to provide a positive limitation at the termini of the upward and downward movement of the platen, it being understood that when the platen is raised to the limit of its normal adjusted position with respect to the degree of projection of the stylus-point 16 the pins 59 will contact with the top ends of the slots, and thus automatically determine and indicate the normal limit of vertical adjustment, beyond which point the screw 50 cannot be further turned, whereby necessity for closely watching the adjustment of the screw is entirely obviated.

The positive limitation of the downward adjustment of the platen by contact of the pins with the bottom ends of the slots is not so important; but it is convenient to provide for this limitation to avoid unnecessary operation of the adjusting-screw 50.

The operation of the mechanism for adjusting the platen will be readily understood.

By the simple turning of the screw 50 the platen will be correspondingly raised or lowered by the action of the block 49 and the crank-shaft connections between the same and the platen. A particular function and advantage secured by the adjustability of the platen, as hereinabove described, is that the foil-paper message sheet or blank may be conveniently inserted initially into position beneath the styluses without danger of tearing or otherwise injuring the paper or injuring the stylus-points, it being simply necessary in this initial insertion of the paper to lower the platen, insert the paper over the same, and then raise the platen up to its normal position of vertical adjustment, in which the stylus-point will be in proper contact with the top surface of the paper. In lieu of adjusting the platen I may under some circumstances, if preferred, have the platen stationary and provide for the vertical adjustment of the stylus-carrier in the manner illustrated in my hereinbefore-mentioned other application for patent.

In practice the foil-paper is inserted beneath the initial roller 27 and beneath the elastic carrying and guide bands 31 and from thence passes inwardly and rearwardly and over the top surface of the platen and over and around the rear side of the roller 29 and between said latter roller and the bands 31, the positive contact and feed of said paper by means of said roller 29 and the bands 31 being insured by the direct-gear connection 34 between said roller 29 and the main operating-roller 30. From the under side of the roller 29 the paper 25 passes in a return movement forwardly between the sides 23 of the frame 22 and beneath the platen and out at the front of the machine beneath the table 24, the continuous reverse movement of said paper inwardly and outwardly being thus attained.

The direct operative connection between the main shaft 13 and the paper-feed mechanism is formed by means of a vertical shaft 61, having bearings in the general framework 11 and carrying a horizontal bevel-gear 62, meshing with the lower side of a bevel-gear 63, carried upon the end of the shaft of the roller 30, which is opposite from the end carrying the gear 35 and at a point beyond the insulation 42. This shaft 61 carries at its lower end a horizontal sprocket-wheel 64, connected by a sprocket-chain, as indicated at 65, with a sprocket-gear 66, carried by the main shaft 13. In lieu of this sprocket-gear connection a direct-gear connection may be employed, if desired. The revolution of the shaft 13 is thus directly communicated to the paper-feed mechanism.

I preferably provide for the independent operation of the paper-feed mechanism by hand, without operation of the main shaft 13, to enable the convenient initial insertion or adjustment of the foil message-paper when the styluses are not revolving, and for this reason I employ a construction and mechanism approximately corresponding to that illustrated in my above-mentioned other application for patent, in which the shaft 61 is divided into an upper and lower section 67 and 68, respectively, said upper section carrying at its top end an operating knob or head 69 and carrying at its lower end, at a point beneath the gear 62, a ratchet-disk 70, which is engaged by a pawl 71, carried by the lower portion or section 68 of the shaft at a point above the gear 64. By means of this construction when the shaft 13 and the stylus mechanism are in operation the paper-feed mechanism will be operated in a corresponding relative movement by means of the pawl-and-ratchet coupling connection between the sections of the shaft 61; but when said shaft 13 and the stylus mechanism are at rest the paper-feed mechanism may be independently operated by merely turning the upper shaft-section 67 in its independent movement with respect to the lower shaft-section 68.

The circuit connections for the respective stylus devices 15 are made through the medium of a commutator which I term a "stylus-commutator" 72, which is mounted upon the main shaft 13, preferably at the top portion thereof and adjacent to the plane of projection of the styluses. This commutator carries a continuous ring 73 and two separate ring sets of segments 74 and 75, respectively. By means of the separate segmental sets 74 and 75 of the commutator I divide the set of stylus devices 15 into two sets or series and also alternately arrange said stylus devices of the respective sets in relation to their successive line of travel. Thus of the two stylus devices which are in operative position with relation to the message-paper 25 one of said styluses will belong to one set and the other or next succeeding stylus will belong to the other set. Therefore, inasmuch as I have herein illustrated a set of ten stylus devices, each segmental ring set 74 and 75 will comprise five segments, as at 76 and 77, respectively, and each stylus device 15 is individually or separately connected by a wire 78 with its respective commutator-segment.

In the practical arrangement of the commutator and styluses, as just hereinabove described, I thus employ a commutator-segment for each stylus device, there being ten stylus devices shown in the drawings and there being consequently ten segments, and the segments are divided into two separate sets of five each, so that the stylus devices are correspondingly divided into two separate sets of five each, the stylus devices of one set being respectively connected to the segments 76 of one segmental set 74, and the stylus devices of the other set being respectively connected to the segments 77 of the other set 75. The stylus devices are alternately arranged with respect to their separate sets, in which construction one stylus device has its wire 78 extending to one of the segments 76 of the set 74, while the next or adjoining stylus device (in respect to the successive operation of the styluses) has its wire 78 extending to one of the segments 77 of the set 75. The commutator and stylus connections, as just described, are of course successive with relation to the revolution of the complete set of styluses. By reason of the alternate connection of the styluses with relation to the different sets of commutator-rings the two styluses which are simultaneously in operative position will respectively connect with the different segmental sets 74 and 75. The relative arrangement of the segments of the two segmental commutator sets is such that the interval of insulation, as at 79, between the segments of one set will be on a plane intersecting the central portion of the segments of the other set, whereby when one stylus is just entering upon its operative contact with the foil-paper the other stylus of the simultaneously-operating pair will be in its operative contact at approximately the middle of the foil-paper sheet or blank, and a pair of said styluses will thus be always maintained in operative position. It will be understood that this relative arrangement of the commutator-segments of the different sets is, with relation to the brush-contacts which project into operative position with relation to the segments, all on the same plane of projection, as clearly shown in Fig. 1. A brush-contact is provided for the three ring-sets of the commutator 72, as shown at 80, 81, and 82, the brush 80 serving the segmental set 74, while the brush 81 serves the segmental set 75 and the brush 82 serves the continuous ring 73. In the intervals of insulation 79 between the segments 76 and 77 of the respective segmental sets 74 and 75 are provided short intermediate segments, there being thus five such intermediate segments in each segmental set 74 and 75, the intermediate segments of the set 74 being designated by the numerals 83 and the intermediate segments of the segmental set 75 being designated by the numerals 84. All of these intermediate segments 83 and 84 are connected with the continuous commutator-ring 73, this being preferably effected by means of wires, as at 85, extending between the segments 83 and 84, and by means of similar wires or connecting-pieces 86, extending between the segments 84 and the ring 73. These intermediate short segments are concerned in the sending of synchronizing impulses, and also in the sending of transmitting and synchronizing impulses at the same time under certain conditions, as will be hereinafter described. It will of course be understood that the length of the various segments of the commutator are proportioned to the required degree or extent of the operative connection of the respective stylus devices in their line of travel over the foil-paper message sheet or blank. The wire connection from the commutator-brush 80 is indicated at 87, the wire from the brush 81 at 88, and the wire from the brush 82 at 89.

At its top portion, preferably at a point just beneath the stylus-commutator, the main shaft 13 is supported upon a suitable ball-bearing, which may be formed by a disk 90, secured to the shaft and bearing against a set of balls 91, which operate in a ball retainer or socket-piece 92, supported upon the general machine-framework 11, the preferred construction being such that said member 92 is supported upon a transverse horizontal web-plate 93, extending within and between the portion of the casing 94 which constitutes the top part of the machine and which incloses the stylus and paper-feed mechanism, the latter mechanism being also preferably supported upon this plate 93, as clearly indicated in Figs. 2 and 1, while the operating-shaft mechanism for the paper-feed mechanism is sustained upon suitable brackets, as at 95 and 96, extending above and below said plate 93, this arrangement providing a very simple construction in which the necessary parts are reduced to a minimum.

It will be understood that the gear connection between the main shaft 13 and the paper-feed mechanism is so adjusted or arranged, by means of the relative size of the gears, that the precise requisite speed of the advance movement of the foil-paper with relation to the operation of the stylus devices will be accomplished, and in this connection I may provide any suitable adjustable means involved in the gear mechanism, whereby the relative speed of movement of the foil-paper and stylus devices may be conveniently regulated, if desired.

In the operation of the machine the main shaft 13 is adapted to be locked against the action of the continuously-operating motor mechanism by which it is revolved, this locking being automatically and electrically accomplished by impulses over the line and serving to insure the simultaneous starting of the transmitting and receiving machines comprised in the same line-circuit by means of the automatic simultaneous release of the stop mechanism. By reason of the arrangement just stated the motor mechanism which operates the machines may be run continuously, yet the machines may be independently stopped in unison and independently started in unison. The devices included in this stop mechanism comprise a unison-magnet 97, the armature 98 of which carries at its outer end a supplementary arm 99, which is pivotally connected to the armature, as at 100, so that it can turn or operate in a plane at right angles to the plane of movement of the armature. Said arm carries a projecting finger 101, which is adapted to be thrown into engagement with a worm 102 upon the shaft 13, which worm leads to a stop-shoulder 103 upon the periphery of a disk 104, which is mounted upon the shaft 13. The relative construction and arrangement are such that when the armature 98 is released the finger 101 will be projected into engagement with the worm 102 and will travel and be guided therein until the stop-shoulder 103 of the disk 104 is engaged by the end of the arm 99; but when the armature 98 is attracted by the magnet 97 the arm 99 will be instantly carried outward and its finger 101 withdrawn from engagement with the worm. It will therefore be understood that whenever the armature 98 is released and the end of the arm 99 is in contact with the shoulder 103 the main shaft 13 will be locked against revolution (though its operating motor or mechanism can continue in operation by reason of a frictional connection or engagement with said shaft) and that when said armature 98 is attracted the main shaft 13 will be free to revolve. Any period of release of the armature 98 which is shorter in duration than the time required for the finger 101 to travel the full extent of the guide-worm will not result in stoppage of the shaft 13, because attraction of the armature 98 at any instant prior to the actual guiding of the arm 99 into engagement with the stop-shoulder 103 will instantly withdraw the arm 99 from engagement with the devices upon the shaft. Accordingly periods of short duration between impulses, though they may cause the magnet 97 to release its armature 98, will not cause stoppage of the shaft 13; but periods of relatively longer duration will cause the stopping of the shaft. To further augment the function of said electromagnet stop mechanism in respect to the postponement of stoppage of the main shaft 13 during the period between impulses, I provide an air or spring cushion device 105, embodying a plunger 106, which bears against the armature 98 in such a manner that it will retard the action of the armature when it is released by its magnet, (thus causing a slow movement in the operation of throwing the finger 101 into engagement with the worm,) but will quicken or accelerate the action or movement of the armature when it is attracted by its magnet, thus quickening or making instantaneous the release of said arm 99 and its finger 101 from any engagement with the top devices upon the shaft.

The unison-magnet and stop mechanism, as just above described, is substantially the same in its various members and features of construction as the corresponding mechanism illustrated in my hereinabove-mentioned other application for patent, to which reference may be had for a more specific description of the construction and operation of this particular part of the mechanism herein illustrated. In the economic construction of the machine as herein illustrated I prefer to have the unison-magnet 97 and its armature and the cushion-resistance device 105 suitably depending from and supported by the cross-plate 93, which is comprised in the top framework or casing structure 94, the worm 102 and disk 104 being relatively arranged upon the shaft 13 at a point just beneath said plate 93 and preferably just above the gear 66. The unison-magnet and stop mechanism is indicated in dotted lines in Fig. 3 and is shown in part in full lines in Fig. 1, it being unnecessary in the present application to specifically duplicate the full illustration of these particular parts, which will be found in my other application. The respective circuit-wires connected with the unison-magnet 97 are indicated at 107 and 108.

I provide a "synchronizer" in direct connection with the main shaft 13. This synchronizer is preferably arranged within the base portion of the machine-casing 94 and just above a bottom plate 109, comprised in the general framework 11, the relative machine structure being preferably such that said bottom plate supports the casing 94 and rests upon a suitable table or other supporting-platform, as indicated at 110. The synchronizer embodies the general structural features of an electric motor, and comprises a central armature 111, which is mounted upon the main shaft 13 preferably at a point just beneath the gear connection between said shaft and the paper-feed mechanism. This armature revolves within a circular field 112, comprised in said synchronizer. Said field preferably comprises a ring-shaped body 113, which rests within a shouldered recess, as at 114, in an upwardly-projecting flange 115, extending from the base-plate 109 and surrounding a circular opening in said base-plate, whereby the synchronizer-field is conveniently mounted in position, which general arrangement forms a convenient, economic, and simple structure. Both the armature 111 and field 113 are provided with a corresponding number of poles 116 and 117, respectively, the number of said poles upon each member of the synchronizer preferably corresponding to the number of stylus devices, and therefore being in the present illustration ten in number. By this relative arrangement the synchronizer is best adapted for the sending of impulses at every tenth period in one complete revolution of the stylus-carrier, thus enabling the sending of a synchronizing impulse for each stylus device and when the synchronizer-poles are opposite each other. The arrangement is preferably such that these synchronizing impulses are always sent when the respective stylus devices are at the center of the foil-paper sheet or blank 25. The sending of the synchronizing impulses and the means by which such impulses are sent at said definite point with relation to the position of the stylus device will be hereinafter fully described. It will be noted that I may vary the number of poles comprised in the synchronizer with respect to the number of stylus devices comprised in the complete stylus set. For instance, said poles may be less in number than the stylus devices or greater in number or may be provided in any lesser or greater multiples of the pairs of stylus devices, so long as the poles of armature and field are opposite at the time of sending the synchronizing impulse; but I prefer to employ the same corresponding number of poles and stylus devices as herein illustrated and to send a synchronizing impulse for each stylus device—that is to say, in the present instance, at every tenth period in one revolution of the complete set of styluses—and to send said synchronizing impulse at the definite point above mentioned. The relative arrangement of the poles of the synchronizer-armature is preferably such that they occupy an intermediate position with respect to each pair of styluses, as is indicated in the diagram in Fig. 18, it being, of course, understood that the armature and stylus-carrier are fixed to the main shaft, and consequently this relative position of the armature-poles and styluses is maintained during the revolution of the shaft. The relatively opposite arrangement of the synchronizer-poles and the relative arrangement of the armature-poles and styluses is concerned in the sending of the synchronizing impulse at the previously-mentioned determined position of the stylus device in the center of the foil-paper sheet, the operation in this connection being hereinafter fully set forth. The poles 117 of the synchronizer-field project inwardly, while the poles 116 and the synchronizer-armature project outwardly with relation thereto. The poles of the field carry the separate windings or coils, as at 118, said coils being connected by wires, as at 119, in the usual manner. The wire 108 from the unison-magnet 97 extends to one terminal of the coils of the synchronizer-field, while from the other terminal extends a wire, as at 120. In the operation of the machine the synchronizer is adapted to act either as a motor or as a brake, the full operation being hereinafter fully explained.

The main shaft 13 is revolved by means of a direct-current motor, as shown in the accompanying drawings; but I may of course employ, if desired, any other suitable or adapted operating mechanism. In the preferred construction the motor is, in the main, of the ordinary type, but is specially adapted to its position and arrangement relative to the machine parts. The motor preferably occupies the space immediately beneath the base-plate 109 and may be set within a supplementary framework 121, which projects beneath the table or support 110 and embodies a bottom plate 122, connected to the base-plate 109 by vertical posts or standards 123. The motor, as shown, comprises field-magnets 124, arranged in a circular series and connected by bottom bars, as at 125, said field-magnets having at their top a concave pole-piece 126, which may be connected to the under side of the base-plate 109 by means of screws, as at 127, or in any other suitable or adapted manner, by which arrangement the field of the motor is suspended from said base-plate 109. The armature 128 of the motor has a frictional engagement with the main shaft 13, as will be hereinafter fully described, and it comprises a disk or plate 129, the periphery of which revolves within the circular series of pole-pieces of the field-magnets, the armature-coils 130 being carried upon said periphery. In the practical construction of said armature the disk 129 preferably carries at its periphery a set of projecting fingers 131, which carry a core-ring 132, which is equidistantly divided by plates or disks 133, which plates or disks separate the respective coils 130, the latter being wound upon the core 132 and suitably insulated in the usual manner.

The general features of construction just above described are specifically illustrated in Fig. 4. Any suitable number of armature-coils 130 may be provided—say, for instance, fifty—and each of said coils is connected by a wire, as at 134, with a segment 135, comprised in a segmental set carried upon a commutator 136, which is in turn carried by the motor-armature 128. The armature 128 is loosely mounted upon the shaft 13, so that it can revolve thereon, and it is preferably provided with a downwardly-extended hub 137, upon which the commutator 136 is carried. Said commutator in the preferred construction comprises a base-ring 138, having an annular bottom shoulder or projection 139, and said commutator also embodies an outer or bottom ring 140, having a similar annular top shoulder or projection 141. An intermediate ring or section 142, having top and bottom angular grooves 143 and 144, respectively, corresponding to the bottom and top angular shoulders or projections 139 and 141 of the base and bottom rings 138 and 140, is interposed between said base and bottom rings and is suitably insulated therefrom, as indicated at 145, and carries the set of segments 135, which set of segments, of course, corresponds in number to the armature-coils 130. This construction provides a secure connection between the intermediate segment-carrying ring 142 and the top and bottom rings 138 and 140 of the commutator 136, said bottom ring 140 being threaded, as at 146, upon the lower portion of the hub 137 of the armature, whereby a secure but detachable assemblage of the described parts of said commutator is insured.

The frictional connection between the motor-armature 128 and the shaft 13 is formed by a disk 147, secured to said shaft, preferably at a point beneath the synchronizer, which disk carries upon its bottom face a frictional contact-surface 148, formed of felt or other adapted material, which bears against the top surface of the armature-disk 129. The necessary frictional contact between the armature-disk and the disk 147, whereby the shaft 13 will be normally revolved with said motor-armature, is maintained by means of a coiled spring 149, mounted upon the shaft 13 and exerting its tension to force the motor-armature upwardly into engagement with the shaft-disk. The tension of this spring may be adjusted by means of a nut 150, operating upon a screw-threaded portion 151 near the lower end of the shaft 13 and acting against the bottom of the spring. In the preferred assemblage of parts the top end of the spring operates against a ball-container or disk 152, which is slidable upon the shaft 13 and carries a set of balls 153, against which bears a suitable cone 154, projecting downwardly from and engaged with the hub of the armature 128. The ball-container 152 is locked against revoluble movement upon the shaft 13 by means of a pin 155, projecting laterally from the shaft into a longitudinally-arranged slot 156 in said ball-retainer, whereby the sliding movement of the latter upon the shaft in correspondence with the pressure-adjustment of the armature 128 is permitted; but said ball-container is locked against turning movement.

By means of the construction and arrangement just described it will be seen that the motor-armature has a slidable frictional connection with the main shaft 13 and is sustained in its movement by a slidable ball-bearing, the construction and arrangement being such that the shaft 13 will normally revolve with motor-armature when the shaft is not locked against the revolution, and the motor-armature will continue to revolve, and the shaft will remain stationary when the latter is locked against revolution by action of the automatic stop mechanism hereinbefore described.

The respective brushes 157 and 158, which supply current to the motor-armature 136, relatively bear against the commutator-segments 135 and may be respectively mounted upon a post or standard 159, rising from the bottom plate 121. Said brushes are respectively connected to the wires 160 and 161 of the motor-circuit, which wires extend, as at 162 and 163, to the respective terminals of the motor field-coils and are in circuit with the battery 164 of the motor-circuit through a suitable switch 165, this motor-circuit being represented in Fig. 1.

The bottom plate 122 is preferably arranged to support a bottom ball-bearing for the main shaft 13, said ball-bearing comprising a ball-container 166, secured to the under side of the plate 122 and carrying a set of balls 167, against which bears a cone 168, carried upon the lower end portion of the shaft 13, this cone having a threaded connection, as at 169, with the threaded lower portion 151 of the shaft, whereby a fine adjustment of the ball-bearings at both the top and bottom of the shaft may be effected. The cone 168 may be secured in adjusted position by a jam-nut 170, operating upon the threaded shaft portion 151.

Upon the main shaft 13 is mounted another commutator 171, which I have designated the "synchronizer-commutator," the office of which is to govern the sending of the synchronizing impulses. This commutator is preferably secured upon the lower or bottom end of the shaft beneath the lower ball-bearing devices. The specific function of this synchronizing-commutator is to short-circuit a part or one-half of the line-battery during the sending of writing or transmitting impulses and to open the short circuit to permit the full force of the line-battery to pass over the line for the sending of a synchronizing impulse. The specific operation of this commutator in this connection will be fully described hereinafter. This commutator carries two continuous commutator-rings 172 and 173, respectively, and two separate sets of commutator-segments 174 and 175, respectively. The segments 176 and 177 of the respective segmental sets 174 and 175 are respectively connected to the continuous rings 172 and 173 by short connecting plates or wires 178 and 179. The segments of the respective sets correspond in number to the set of stylus devices 15, (there being thus ten segments in each segmental set 174 and 175,) and the periods of insulation, as at 180, between said segments are arranged on a plane corresponding to a central transverse plane extending radially through the stylus devices, so that when a stylus device is in the center of the foil-paper 25 the armature-brush will be on said period of insulation between the segments. This arrangement is concerned in the sending of synchronizing impulses at the just-mentioned specific period or point in the position of the respective stylus devices during their rotary line of travel. The segmental sets 174 and 175 are correspondingly arranged with relation to the relative position just stated. This synchronizing-commutator embodies four brushes 181, 182, 183, and 184, respectively contacting with the segmental set 174, the continuous ring 172, the segmental set 175, and the continuous ring 173. The described arrangement of said commutator and the relative position of the periods of insulation between the segments will be understood by reference to Fig. 1 and the diagram in Fig. 18. From the brush 181 a wire, as at 185, extends to the wire 87, communicating with the brush 80 of the segmental set 74 of the stylus-commutator 72. From the corresponding brush 183 extends a wire, as at 186, to the wire 88, which communicates with the brush 81 of the other segmental set 75 of the stylus-commutator. From the brush 182, which contacts with the continuous ring 172, which is in connection with the segmental set 174 of the synchronizing-commutator, extends a wire, as at 187, to one of the line-batteries, 188, the arrangement being such that said wire 187 operates to divide said line-battery 188 into two half-sections 189 and 190, respectively. Similarly a wire, as at 191, extends from the corresponding brush 184 to the other line-battery, 192, which battery is thus correspondingly divided into two half-sections 193 and 194, respectively. The arrangement is such that when the brushes 181 and 183 are on the commutator-segments 176 and 177 the line-batteries will be divided, (by the short circuit thus established,) which condition exists during and for the sending of writing or transmitting impulses, while when the brushes 181 and 183 are on the period of insulation 180 between the segments said short circuit will be opened and the full force of the battery will pass over the line during and for the sending of a synchronizing impulse.

It will be understood that the poles of the synchronizer may be arranged in any desired relative position with relation to the relative position of the stylus devices, inasmuch as the position of these poles does not itself govern the point of operation at which the synchronizing impulses are sent, the synchronizing impulses being governed in their sending, with relation to the position of the stylus devices upon the foil-paper, entirely by the relative arrangement or position of the segments of the synchronizing-commutator with respect to the relative position of the stylus devices. I prefer in this relative position to provide for the sending of the synchronizing impulses when the stylus is in the center of the foil-paper, as hereinbefore mentioned; but by merely so arranging the segments of the stylus-commutator the synchronizing impulses can be sent at any other position of the stylus devices. The connecting-wires, which are provided in the usual manner between one of the terminals of the armature-coils 130 of the direct-current motor, are represented at 195 in Fig. 4.

In the circuits relating to the transmitting-machine is comprised an electromagnetic device which I designate a "stylus short-circuiter," which device is an important element in the operation of the apparatus. The preferred construction of this stylus short-circuiter is clearly illustrated in the detail views in Figs. 7 and 8 of the drawings, in which 196 designates the armature, which comprises a highly-flexible thin strip 197, which may be either of magnetic or non-magnetic material and which extends transversely across and above a base 198, its ends being suitably secured to and supported by posts or standards 199. At the center of the strip 197 is secured a small block or strip of iron or other magnetic material 200, and directly opposite this central portion of the armature-strip 197 and at opposite sides of said strip are arranged the pole-pieces 201 and 202 of two respective pairs of magnets 203 and 204, the pair 203 being opposite one face of the armature, while the pair 204 is opposite the other face. The pole-pieces preferably extend or project inwardly at right angles from the cores 205 and 206 of the respective pairs of magnets, said cores carrying the usual windings or coils, as at 207 and 208. The armature-strip 197 carries the platina contact-point 209. Adjustability of the space between the armature and the pairs of magnets at the opposite sides thereof is effected in the usual manner by having said magnets adjustable to and from said armature through spectacle-frames 210, which are carried by the base 198 and support and guide said magnets. This adjustability of the magnets is effected by a screw 211, operating through a post or standard 212, projecting from the base 198, said screw carrying a thumb-nut 213 at its outer end and being connected at its inner end with a cross-piece 214, connecting with the cores of the respective pairs of magnets. A coiled spring, as at 215, is interposed between the standard 212 and the cross-piece 214. The contact-screw 216 operates between the pair of magnets 204 and through the intermediate connecting-piece of the ring or spectacle-frame 210, while the stop-screw 217 correspondingly operates between the pair of magnets 203 and through the cross-piece of the other ring or spectacle-frame. The armature is constructed, as just above described, with the highly-flexible thin strip 197 and the central magnetic block 200 for the purpose of reducing the weight of the armature and securing a high degree of flexibility, whereby its rapidity of action will be enhanced. The windings of the coils of the magnets of this stylus-short-circuiter device are especially arranged in a manner which will be hereinafter fully described. While I prefer to employ the construction of stylus-short-circuiter device as just above described, I may use any other suitable or adapted mechanism or device which is capable of performing the same office.

I will now describe more specifically the particular characteristics of the receiving or recording machine, with special relation to the points in which the receiving or recording machine embodies structural differences from the sending or transmitting machine. In this connection reference may be had particularly to Figs. 11, 12, and 13 of the drawings.

The transmitting and receiving machines embody their own circuit connections, whereby they perform their respective operative functions in the complete operation of the facsimile telegraphic apparatus; but said transmitting and receiving machines are connected over the line by a single line-wire, over which both the transmitting and synchronizing impulses are sent, and it will be understood any practical number or plurality of transmitting and receiving machines may be arranged in the same line-circuit to provide the desired number or plurality of stations, and inasmuch as the current transmitted over the line in the operation of my improved apparatus is similar to any ordinary telegraphic current it is apparent that any ordinary relay and duplexing arrangements or methods may be employed.

The transmitting and receiving machines are twins in their general characteristics and operation except in the specific details concerned in the respective functions of sending and receiving the impulses and transmitting and recording the matter upon the foil-paper message sheet or blank. In those features of construction in which the transmitting and receiving machines are identical or substantially alike the same numerals of reference are employed in the drawings. For instance, the receiving-machine embodies substantially the same general framework 11 and casing 12 and the main shaft 13, carrying the stylus-carrier 14, the shaft being mounted in the same general manner and arrangement as in the transmitting-machine, in connection with a corresponding unison-magnet, stop mechanism, synchronizer, and motor mechanism. The synchronizing-commutator 171 is omitted from the main shaft of the receiving-machine, it being of course unnecessary to have more than one of said commutators for governing the synchronizing impulses for both machines and said commutator being of course preferably arranged adjacent to the line-batteries 188 and 192, so that its connection therewith for the purpose of dividing the same, as hereinabove described, can be conveniently effected. The mechanism for operating the paper-feed mechanism by direct connection with the main shaft and the means whereby said paper-feed mechanism may be operated independently of the revolution of the main shaft (to enable initial feed and adjustment or control of the paper) are the same in the receiving-machine as they are in the transmitting-machine. The paper-feed mechanism whereby the recording-paper is fed with relation to the action of the recording-styluses is also substantially the same in the receiving-machine as in the transmitting-machine except in certain specific details, which will be hereinafter described. The stylus-commutator of the receiving-machine is also substantially the same in construction as the stylus-commutator of the transmitting-machine, except that the intermediate short segments 83 and 84 and their connection with the continuous ring 73 are omitted, and the wiring connections between the commutator-rings and the recording stylus devices and the specific function of said stylus-commutator of the receiving-machine are somewhat different, as will be hereinafter described. The recording stylus devices as comprised in the receiving-machine are of course structurally different from the transmitting stylus devices.

It may here be stated that the relative positions of the stylus-commutator and synchronizing-commutator upon the shaft of the transmitting-machine may be conveniently varied as desired.

The paper-feed mechanism of the receiving-machine is designed to feed the recording-paper 218 in a continuous movement from a web or roll 219, which is supported in suitable brackets or arms 220 220, which may project upwardly at the front of the paper-feed-mechanism frame, this continuous feed from a web being designed for greater speed and convenience. The arrangement of rollers and gear connections and of the elastic bands 31 is the same in the paper-feed mechanism of the receiving-machine as in the corresponding mechanism of the transmitting-machine, and the recording-paper 218 is fed in a precisely corresponding manner under the bands 31 and around the rollers as is the case with the feed of the foil-paper message sheet or blank; but in the recording-paper-feed mechanism the adjustable platen 26 is omitted and the front table 24 is continued rearwardly at 221 to form the platen over which the recording stylus devices travel. While I prefer this continuous stationary-platen arrangement in the receiving-machine, the same arrangement of adjustable platen as is comprised in the transmitting-machine may be employed, if desired. The foil-paper contact-brush is of course omitted in the recording-paper-feed mechanism, and the frame of said mechanism need not be insulated, inasmuch as none of its parts are in circuit connection. To facilitate the feed of the recording-paper 218 forwardly in its return movement under the platen 221 after it passes in rear of and under the roller 29, I preferably provide an inclined guide-table 222, mounted between the sides 23 of the paper-feed mechanism and extending downwardly and forwardly, over which table the recording-paper 218 passes, and the lower front edge 223 of this inclined guide-table will conveniently serve as a cutting edge across which the recording-paper may be torn to separate the recorded message from the main sheet of the web whenever desired.

The recording stylus devices embody a main frame 224, which preferably comprises two divergent side arms 225 225, connected at their rear end by a cross-piece 226, from which the core-arm 227 projects forwardly between the arms 225, said frame 224 being supported in proper position above the stylus-carrier 14 by means of a standard 228, projecting upwardly from the latter. The coil 229 of the electromagnet is carried upon the core-arm 227, and the armature 230 extends beneath the front end of the core-arm 227 and transversely across the device between the arms 225, it being supported at its ends by said arms and connected therewith. This armature is designed to have a high degree of flexibility and for this purpose is preferably constructed in a manner similar to that already described with relation to the armature of the stylus short-circuiter, it having a flexible thin strip 231, carrying a series of magnetic blocks or pieces 232. The general specific structure of this armature of the recording stylus device is shown in my hereinbefore-mentioned other application for patent, to which reference may be had for a full description of the construction and advantages and operation. From the center of the armature 230 projects a vertical rod or arm 233, which is carried by the armature and is preferably securely fastened thereto by having its lower end 234 passing through the flexible strip 231 and through the central or middle block 232. Said rod 233 is guided in its movement corresponding to the vibrations of the armature 230 in a corresponding opening 235 in the front end of the core-arm 227, and to the top end of said rod 233 is pivotally connected, as at 236, the rear end of a lever bar or rod 237, which is fulcrumed, as at 238, in a standard 239, projecting from the stylus-carrier 14. The free front end of the lever-rod 237 bears upon the top end, as shown at 240, of the recording-stylus proper, 241, said recording-stylus consisting of a rod or pin, as shown. The recording-stylus rod is mounted and carried by a suitable casing 242, the lower end of which, 243, projects through a corresponding opening 244 in the stylus-carrier 14 and has a threaded connection therewith, as at 245. The top end of the casing 242 is preferably closed by a screw-cap 246. The stylus-rod 241 is guided at its top end through an opening 247 in the screw-cap 246 and projects upwardly beyond the latter to its contact with the lever-rod 237, and its lower end is guided in a corresponding opening 248, formed in the lower end portion 243 of the casing 242, and projects downwardly beneath the stylus-carrier into its proper operative position with relation to the platen 221. The lower end portion of the stylus-rod is preferably angular or rectangular in cross-section, as indicated at 249, and the guide-opening 248 is of corresponding contour, whereby turning of said stylus-rod within its carrying-casing is prevented. It will be understood that the stylus-rod is capable of a sliding or yielding movement in a vertical plane, this movement being controlled by a coiled spring 250, contained within the casing 242 and bearing at its lower end against the bottom of said casing and at its upper end against a circumferential stop-shoulder 251, which will limit the vertical projection of said stylus-rod by contact with the under side of the screw-cap 246. The stylus-rod 241 is projected downwardly against the tension of its returning-spring 250 to effect marking upon the recording-paper 218 by action of the lever-rod 237, which is operated by the armature 230 of the electromagnet.

I prefer to employ ink for marking the recording-paper, and for this purpose the lower end of the stylus-rod 241 is split or bifurcated and pointed, as shown at 252, to provide a structure which is approximately a pen-point and which will hold a supply of ink and properly feed the same when the point contacts with the paper 218. The feed of ink to the stylus-points 252 is preferably effected by means of a feed wheel or brush 253, (see Fig. 11,) which is revolubly mounted in a suitable casing or reservoir 254, adapted to carry a supply of ink from which said contact-brush 253 is fed. The reservoir 254 may be supported upon a standard 255, projecting from the upper cross-plate 93, which is comprised in the general framework 11 of the machine, which standard is preferably arranged in position immediately under the rear portion of the stylus-carrier 14, the relative position and arrangement being such that the points of the recording stylus devices projecting below the stylus-carrier will pass in contact with said feed roller or brush 253 during their circular line of travel as they are carried around by the revolution of the stylus-carrier.

The set of recording-styluses corresponds in number and in relative arrangement to the set of transmitting-styluses, and they are correspondingly arranged in a circular series upon the stylus-carrier 14. The relative arrangement of the set of recording-styluses with respect to the set of transmitting-styluses is such that each individual stylus of the recording set and its fellow stylus of the transmitting set are in identically the same position with relation to their disposition upon the stylus-carrier, so that when a transmitting-stylus is, for instance, in exactly the center of the foil-paper message sheet or blank its fellow stylus of the recording set will be in identically the same position with relation to the recording mechanism of the receiving-machine. In this connection it will be understood that when one of the transmitting-styluses contacts with insulating-ink upon the foil-paper sheet the impulse which is then sent over the line will actuate the corresponding fellow stylus of the recording set to cause it to produce a mark upon the recording-paper identical in length or duration to the length or duration of said insulating-contact. While I prefer to have the stylus devices of the respective transmitting and recording sets equidistantly arranged under some circumstances, (particularly with relation to some features of operation involved in the sending of the synchronizing impulses,) I may mount the transmitting-styluses in such a manner that there is a slight variation in the actual space or distance between the same. If this variable condition exists with respect to the transmitting-styluses, it will then be necessary to mount the corresponding recording-styluses in the same identical manner.

While I have herein specifically shown and described a mechanism for marking with ink upon the recording-paper, it will be understood that in lieu of this arrangement for the use of ink a carbon-sheet may be employed in any suitable or convenient manner, so that it occupies a position between the recording-paper and the platen 221.

The stylus-commutator 256 of the receiving-machine comprises in its similar construction with respect to the stylus-commutator 72 of the transmitting-machine two segmental ring sets 257 and 258, respectively, and a continuous ring 259. The segmental ring sets 257 and 258 are respectively made up of five segments 260 and 261, respectively, divided by intervals of insulation, as at 262, the relative arrangement being such that the intervals of insulation between the segments of one of said segmental ring sets intersects the plane of the central portion of the segments of the other segmental ring set. In the recording-stylus commutator 256 the intervals of insulation 262 preferably correspond in length approximately to the distance between the main segments of the segmental ring sets of the transmitting-stylus commutator, whereby there will be no actuation of the recording-styluses during the period of transmission of a synchronizing impulse, as will be readily understood from the description of operation hereinafter made. In this connection it will be noted that the synchronizing impulses are sent when the brushes of the transmitting-stylus commutator are on the small segments in the interval of insulation 79 between the main segments of the segmental ring sets of said transmitting-stylus commutator; but in the recording-stylus commutator these intermediate short segments are omitted and the interval of insulation 262 extends over a space corresponding to that which would be occupied by said intermediate short segments. From one terminal of the coil of each recording stylus device a wire, as at 263, extends to the respective segments comprised in the segmental ring sets upon the stylus-commutator, the arrangement being such that said recording-stylus devices are successively and alternately connected with the ring-segments, so that the alternate stylus devices are connected by their wire 263 successively with the segments 260 of the segmental ring set 257, while the intervening alternate recording-stylus devices are correspondingly connected to the segments 261 of the segmental ring set 258, this arrangement being relatively the same as that involved in the connections between the transmitting-styluses and the segments of the segmental ring sets of the transmitting-stylus commutator. The brushes, which are respectively in contact with the ring sets 257 and 258 and the continuous ring 259 of the commutator 256, are designated by the numerals 264, 265, and 266, respectively. The relative arrangement of the main segments of the transmitting-stylus commutator 72 and the recording-stylus commutator 256 and the contact-brushes therefor is such that the stylus-commutator segments and the contact-brushes therefor occupy a corresponding position in both the transmitting-stylus and recording-stylus commutator mechanisms. Thus when one of the transmitting-styluses is in contact with the foil-paper message-blank and the commutator contact-brush is in contact with the main commutator-segment to which said transmitting-stylus is connected the corresponding fellow stylus of the recording set will have the contact-brush of the recording-stylus commutator in corresponding position and contact with the main commutator-segment to which said recording-stylus is connected. The whole set of recording-stylus devices have the terminals of their coils which are not connected with the commutator-segments connected in series with the continuous ring 259 of the commutator 256. This connection just mentioned may be formed by having short wires, as at 267, extending from one of the terminals of the coil of each respective recording-stylus device to a common wire 268, which extends, as at 269, to the continuous ring 259, (see Fig. 13,) or said connecting-wires 267 may extend independently to the ring 259, as indicated in the diagrammatic Fig. 19. The wires extending from the respective brushes 264, 265, and 266 are designated, respectively, at 270, 271, and 272.

Comprised in the stylus-circuit of the receiving-machine are polarized receiving-relays. While I may employ any suitable or adapted construction of relay device for this purpose, I prefer the device which is illustrated in Figs. 9 and 10 and which is adapted to produce the most effective results in connection with the general apparatus involved in my invention and improvements. This polarized relay device comprises an armature 273, which is substantially the same in its structural features as the armature 197, hereinabove described in connection with the stylus short-circuiter device illustrated in Figs. 7 and 8. This armature 273 extends between a pair of magnetic coils 274 274 and is sustained in position by means of posts or standards 275, projecting from a base 276 and supporting the ends of the armature. From the cores 277 of the coils 274 a magnet 278 extends downwardly beneath the base and then upwardly above said base into a position opposite the coil, the terminals of said respective magnets being thus at opposite sides of the armature 273. From the top ends of the respective cores 277 of the coils 274 pole-pieces 279 project, respectively, diagonally inward with relation to the armature and at opposite sides of the latter, while corresponding pole-pieces 280 project in a relative and corresponding manner from the respective terminals of the magnets 278. There are thus four pole-pieces divided into a pair at opposite sides of the armature and converging from the four points formed by the two cores of the magnetic coils and the two terminals of the magnets. The contact-screw 281 and the stop-screw 282 respectively operate in suitable brackets, as at 283, which project from the base 276. The coils are connected by a wire 284.

The wires from the unison-magnet 97, comprised in the stop mechanism of the receiving-machine, are designated at 285 and 286, respectively, the wire 286 extending to one terminal of the coils of the synchronizer-field of the receiving-machine, while from the other terminal of said synchronizer-field extends a wire, as at 287. (See Fig. 11 and diagrammatic Fig. 19.)

In the completion of the circuits of the transmitting and recording machines and the main-line circuit and the controlling devices comprised in said circuits the following wire connections and devices will be noted: The wire 107 from one terminal of the unison-magnet 97 of the receiving-machine extends to the armature 288 of a unison and synchronizer relay 289 for the transmitting-machine, while the wire 120, (which is comprised in the same circuit,) which extends from one terminal of the field of the synchronizer of the transmitting-machine, extends to the contact-screw 290 of said relay 289. A local circuit is thus established in the transmitting-machine mechanism, which extends from the armature 288 of the unison and synchronizer relay 289 over the wire 107 to the unison-magnet 97 and returns from said unison-magnet over the wire 108 to the field of the synchronizer and from said field over the wire 120 to the contact-screw 290 of the relay 289, this local circuit having a battery, as indicated at 291, which is preferably in connection with the wire 120. This local circuit thus comprises both the synchronizer and unison magnet. It is closed when the relay 289 attracts its armature and is opened when said armature is released.

The operation of the unison-magnet 97 through the action of the relay 289 is the same as that described in my hereinabove-mentioned other application for patent, to which reference may be had in this connection, it being understood that only a long interval between impulses will complete the operation of the stop mechanism actuated by the unison-magnet and that frequent or short intervals between impulses will not result in release of the armature of the unison-magnet by reason of the controlling action of the air and spring mechanism which governs the movement of said armature.

The wire 87, which extends from the commutator-brush 80 of one of the segmental sets of the transmitting-stylus commutator and passes through one of the line-batteries 188, extends from said battery to one of the coils 203 of the stylus short-circuiter, and the corresponding wire 88 from the commutator-brush 81 passes through the other line-battery 192 and to the same coil 203. These wires 87 and 88 are reversely coiled, as respectively indicated at 292 and 293, (see Figs. 17 and 18,) and they then pass over to the other coil 203 and are reversely coiled and centrally connected, as at 294, by a single wire 295, which is comprised in the main-line circuit and extends to the ground, as represented at 296. From the contact-screw 216 of the stylus short-circuiter extends a wire 297 to the coils 204 of the stylus short-circuiter and passes from said coils to a connection with the wire 41, which extends to the foil-paper brush, this connection being governed by a switch, as at 298. The wire 89, which extends from the brush 82, which contacts with the continuous ring 73 of the transmitting-stylus commutator, extends to the armature of the stylus short-circuiter. The wire 41, which is in circuit connection with the foil-paper brush, extends, at a point beyond its connection with the wire 297, to the coil of the unison and synchronizer relay 289 of the transmitting-machine, and from the coil of said relay extends the main-line wire 299, which connects the transmitting and receiving machines, a switch, as at 300, being interposed in the line-wire 299 for the purpose of opening and closing the line-circuit. In the receiving-machine a local circuit for the unison-magnet 97 and the synchronizer is formed by the wire 287, which extends from the armature 288 of the unison and synchronizer relay 289 of the receiving-machine to the field of the synchronizer, the wire 286 extending from said field to the unison-magnet 97 and the wire 285 extending from said unison-magnet to the contact-screw 290 of the relay 289, the battery (represented at 291) for this local circuit of the receiving-machine being preferably arranged in connection with the wire 287. The polarized receiving-relays of the receiving-machine are arranged in any suitable manner to provide for their opposite polarity and have their contact-screws 281 connected by a wire, as at 301, from which extends the wire 272, which connects with the brush 266, which contacts with the continuous ring 259 of the recording-stylus commutator. The wires 270 and 271, which extend, respectively, from the brushes 264 and 265 of the respective segmental sets of the recording-stylus commutator, are respectively connected with the armatures of the respective polarized receiving-relays. These relays are designated, respectively, by the numerals 302 and 303, the wire 270 extending to the relay 302, while the wire 271 extends to the relay 303. A local recording-stylus circuit is thus produced through the wire 301, the contact-screws of the polarized receiving-relays, the armatures of the latter, the wire 272, the recording-stylus commutator and its brushes, and the wires 270 and 271, a battery for this circuit being represented at 304, which battery is preferably arranged in connection with the wire 272. The main-line wire 299 extends through the coils of the polarized receiving-relays 302 and 303 and from thence to the coil of the unison and synchronizer relay 289 of the receiving-machine and from said coil to the ground 296. In connection with the wires 191 and 187, which respectively divide the line-batteries 192 and 188 and respectively extend to the brushes 184 and 182, which contact with the continuous rings of the synchronizing-commutator 171, I preferably arrange non-inductive resistances, as respectively represented at 305 and 306, which will serve in the usual manner to prevent an excessive current from passing over the local short circuits which at times exist in the operation of the transmitting-machine. A similar non-inductive resistance, as at 307, may be, if desired, arranged in connection with the wire 297 for the purpose of preventing an excessive current over the local circuit which is operated by the stylus short-circuiter; but in view of the fact that there may be sufficient resistance in the coils of the stylus short-circuiter to produce the desired effect in this connection this non-inductive resistance 307 is not essential.

The operation and advantages of my invention will be readily understood by those skilled in the art to which it appertains and by reference to the following description. Preliminary to a description of operation I will first describe the theory or principle of wiring which is involved in my invention and improvements, with particular reference to the diagrammatic Fig. 17 of the drawings.

The writing impulses are weak currents, and the synchronism impulses are heavy currents.

The writing-currents of the two styluses which are simultaneously in operative position and in contact with the foil-paper message sheet or blank are kept separate by causing one stylus to transmit only negative currents, while the other stylus will transmit only positive currents. It will be noted that in carrying out this negative and positive arrangement the respective two sets of five alternate transmitting-styluses (which comprise the complete set of ten styluses) are respectively connected successively to the separate segments of the respective segmental ring sets (74 and 75) of the stylus-commutator, said segments being so arranged that the period of insulation between each pair of segments of one set is opposite the center of the segments of the other set. The commutator-brush for one of said segmental ring sets is in connection with the negative pole of one of two line-batteries, and the brush for the other of said segmental ring sets is in connection with the positive pole of the other line-battery. The other terminals of the two line-batteries are in connection separately with the windings of the differential coils 203 of the stylus short-circuiter, (through that portion of the wires 87 and 88 which extends from said other terminal of the line-batteries.) The windings of these coils are in opposite directions, and the terminals of said windings are connected together and to the ground by means of a ground-wire 295. By reason of the arrangement and circuit connections, as just stated, it will follow that if one of the operative pair of transmitting-styluses is in contact with insulating-ink on the message sheet or blank the circuit of the battery to which said stylus is connected is broken at said insulating-point, while the other stylus and its battery are directly connected with the line, and a current will be sent over the line which is of a polarity corresponding to the polarity of the battery-pole to which the stylus which is in contact with the foil-paper, but not contacting with the insulating-ink, is connected. When both of the pair of transmitting-styluses which are in operative position are in contact with the foil-paper simultaneously and neither one is in contact with insulating-ink, then a local circuit is established which passes from one pole of one of the line-batteries to one of said styluses, to the foil-paper, to the other of said styluses, to the other line-battery, and from said battery to and over the windings of the differential coils of the stylus short-circuiter and back from said windings to the other line-battery, thus completing a local circuit through both the line-batteries and through the foil-paper. It will be noted that this short circuit presents a so much shorter path for the line-battery current than does the line itself that the current will not pass through the ground connection and through the receiving-machine and back over the line, but will simply pass over the short circuit which is established, as above set forth, by reason of the pair of styluses being in simultaneous contact with the foil-paper. Therefore, it will be understood, when the pair of styluses are in contact with the foil-paper and neither of said styluses is in contact with insulating-ink thereon the current of the line-batteries passes over a local short circuit; but when one of the pair of styluses contacts with insulating-ink on the foil-paper this short circuit is broken and the current is sent over the line through the other stylus.

I will now describe the theory of wiring, which is related to the sending of the heavy synchronizing impulses and includes the offices of the stylus short-circuiter, and in this connection reference may be had to Fig. 18, as well as Fig. 17. The heavy currents for the synchronizing impulses are permitted to pass over the line by the action of the synchronizing-commutator, which operates (as will be readily understood from the previous descriptions of the arrangement of the segments and brushes and periods of insulation) to automatically short-circuit a portion (illustrated as one-half) of the line-batteries during the sending of writing impulses and which automatically at determined intervals (illustrated as at every tenth period in one complete revolution of the complete set of transmitting-styluses) opens the short circuit just above mentioned, and thus permits a heavy impulse to pass over the line, which latter action always occurs when either one of the brushes of the stylus-commutator segmental ring sets is on one of the short intermediate segments; but inasmuch as these heavy impulses are permitted at set intervals and it is therefore necessary to send the same whether the styluses are in contact with insulating-ink or not it becomes also necessary to transmit writing or other matter upon the message blank or sheet at the same time that a synchronism impulse is transmitted. I therefore arrange to reverse the polarity of the synchronizing-current during the period in which the stylus is in contact with insulating-ink. It may be here stated that the synchronism impulse is ordinarily always of the same polarity as the polarity of the line connection of the stylus which is in the center of the message-blank, or that, in other words, the synchronizing-current always passes through the stylus which is at a central point with reference to the message sheet or blank when said stylus is not in contact with insulating-ink. Now should there be insulating-ink in contact with said stylus of course no current can pass from the stylus to the foil-paper, and as the circuit of the other stylus is now open at the stylus-commutator and at the contact of the stylus short-circuiter no current can flow to the line and no current will now pass over the differential coils of the stylus short-circuiter. If, therefore, no current passes over the line and the circuit of the line-batteries is now entirely open, the armature of the stylus short-circuiter will be released and will contact with the contact-screw. This closes the circuit of the stylus which is not in contact with insulating-ink and the line connection of the foil-paper brush (through the short intermediate segment connection) and sends the current from the battery of said stylus over a connecting-wire 297, leading from the contact-screw of the stylus short-circuiter to the line, the current being therefore of a polarity corresponding to the polarity of the stylus which is not on insulating-ink, and accordingly of opposite polarity to the stylus in the center, and the synchronizing impulse is thus reverse in polarity when the stylus in the center is on insulating-ink.

For purposes of clear illustration of the circuit arrangements for reversing the polarity of the currents I have in Fig. 18 designated the stylus which is in the center of the message sheet or blank N—, while the adjoining stylus, which has just entered upon the message-sheet, is designated P+. These styluses are respectively connected, through their respective wires and the commutator-segments and the respective brushes 80 and 81 and the wires 87 and 88, with the line-batteries 188 and 192, the battery 188 being accordingly marked N— and the battery 192 P+; that is to say, the wire 87 is connected with the negative pole of the line-battery 188 and the wire 88 is connected with the positive pole of the line-battery 192. It will therefore be understood that the N— battery 188 is connected by the wire 87 and the brush 80 with the segmental ring set 74 of the stylus-commutator, while the P+ battery 192 is connected by the wire 88 and brush 81 with the segmental ring set 75 of the stylus-commutator, and inasmuch as the styluses of the complete series are alternately connected, respectively, with said segmental sets 74 and 75 they are alternately and respectively in circuit connection with the N— and P+ line-batteries.

In Fig. 19 I have designated the polarized receiving-relay 302 P+ and the corresponding relay 303 N—, and the recording-stylus which is in the center of the message-sheet is designated P+, while the next adjoining stylus, which is just entering upon the message-sheet, is designated N—. The recording-stylus P+ is in connection, through its connecting-wire 263 and the commutator segmental set 257 and the brush 264 and wire 270, with the corresponding receiving-relay P+, while the recording-stylus N— is in connection, through its connecting-wire 263 and the segmental ring set 258 and the brush 265 and wire 271, with the corresponding receiving-relay N—. It will therefore be understood that the recording-stylus P+ will be actuated only by positive impulses, while the recording-stylus N— will be actuated only by negative impulses. The complete set of recording-styluses thus respectively alternate in P+ and N— connection with the polarized receiving-relays by reason of the respective commutator segmental sets and the respective connection thereof with the polarized receiving-relays, as will be readily understood.

From the foregoing it will be noted that the relative arrangement of the transmitting and recording styluses is such that when an N— transmitting-stylus is in the center of the message sheet or blank its corresponding recording-stylus, which is in the center of the message-paper and which is simultaneously actuated, will be P+. Thus when the transmitting-stylus N— touches insulating-ink and a local short circuit (which will be hereinafter described) in the transmitting-machine, which is completed through the styluses N— and P+ and the foil-paper, is broken the impulse sent over the line will be through the stylus P+ and will consequently be a positive impulse from the P+ line-battery 192 and will operate the P+ polarized receiving-relay 302, and therefore actuate the corresponding recording-stylus, which is then at an identical corresponding point upon the message-paper in the receiving or recording machine, (which is at the center of the message-paper,) this recording-stylus being P+. The sending of writing impulses by currents of reversed polarity will thus be understood.

In the diagrammatic Fig. 17 the designation of the styluses and line-battery in their positive and negative arrangement corresponds substantially to that illustrated in Fig. 18.

It will be noted (see Fig. 18) that there are four local short circuits comprised in the transmitting-machine, which are operatively opened and closed at various times in the operation and which are all in connection with the line and through the line-batteries. One of these local short circuits is completed through the foil-paper and the styluses N— and P+ and is closed when there is no writing or other matter in insulating-ink on the message sheet or blank or when neither stylus is in contact with insulating-ink and when no synchronizing impulse is being sent. This local short circuit may be traced as follows:

from stylus N— and wire 78 and the stylus-commutator segment to brush 80 and wire 87 through battery 188 to the stylus short-circuiter, and from thence back over wire 88 (the current does not pass to the ground over the wire 295, but follows the shorter path, as described) and through battery 192 to brush 81 and through the stylus-commutator segment and wire 78 to the stylus P+, and from thence through the foil-paper to the stylus N—. This circuit is indicated clearly in Fig. 17, and it would be also represented in Fig. 18 if the position of the machine were slightly advanced, so as to bring the brush 81 on the commutator-segment connected with the stylus P+ simultaneously with the contact of the brush 80 with the commutator-segment connected with the stylus N—, the illustrated conditions in Fig. 18 being those existing at the time of sending a synchronizing impulse, at which time the local short circuit just described would of course be open. This local short circuit is opened and closed in the operative contact of the styluses with insulating-ink and in the operation of sending impulses over the line. A second local short circuit in the transmitting-machine is completed through the stylus short-circuiter and the foil-paper brush-contact, and the stylus which is at the center of the message sheet or blank N—. This local short circuit occurs when the armature 196 of the stylus short-circuiter is against its contact-screw 216 at the instant just after sending a writing and synchronizing impulse at the same time, when the stylus N— passes off the insulating-ink and just before the contact of the armature 196 and screw 216 is broken by said movement of the stylus N—, said short circuit thus enabling the attraction of the armature 196 by the coils of the stylus short-circuiter, to which are connected the wires 87 and 88. The local short circuit just mentioned may be traced as follows: From the stylus N— through the wire 78 and commutator-segment to the brush 80 and wire 87 through the battery 188 to the stylus short-circuiter and back from the wire 88 through battery 192 to the brush 81 and small segment 84 and the connecting plate or wire 86, to the continuous commutator-ring 73 and brush 82 and wire 89 to the armature 196 and contact-screw 216 and wire 297 through switch 298 to the wire 41 and foil-paper contact-brush 36 and the foil-paper to the stylus N—. The second local short circuit just described is merely a momentary one, and it may be understood by reference to either Fig. 17 or 18, it being assumed that the armature 196 is in contact with the screw 216 and the commutators and their brushes are in the position assumed at the instant just following the sending of a writing and synchronizing impulse at the same time and when the stylus N— has just passed from its contact with insulating-ink, which contact occasioned the sending of said writing and synchronizing impulse at the same time, as will be understood from the preceding statements contained in the description of the theory of wiring. The other two short circuits of the transmitting-machine are those two which are completed by the short circuiting or synchronizing commutator 171 and are concerned in the transmission of the synchronizing impulse. They exist when no synchronizing impulses are being sent and are for the purpose of short circuiting one-half of the line-batteries during the sending of writing impulses. As soon as the just-mentioned short circuits are broken by the action of the synchronizing commutator-brushes in contact with the periods of insulation between the segmental rings a synchronizing impulse is sent with the full force of the line-battery. Said two short circuits are respectively thrown around each of the line-batteries 188 and 192, and they of course relatively correspond in their general arrangement. In tracing the one related to N— battery 188, (see Fig. 18,) assuming a slight advance in the position of the machine, we may start at the half 190 of said battery 188 and through the wire 187 to the brush 182 and the continuous commutator-ring 172 and through the wire or connection 178 thereof with the commutator-segment 176 to the brush 181 and the wire 185 to the wire 87 and to the battery-half 190. Another local circuit which is comprised in the transmitting-machine, but is not a part of the line-circuit, comprises the unison-magnet 97 and the synchronizer. It involves a local battery 291 and is completed by the unison and synchronizer relay 289. This local circuit is always open during the sending of writing impulses alone, and it is closed when the full force of the battery going over the line in the sending of synchronizing impulses causes the armature 288 of the unison synchronizer-relay 289 to be attracted, and the circuit is therefore concerned in the synchronism arrangement. (This circuit will also be of course closed when synchronizing and writing impulses are sent at the same time in the manner hereinbefore described. In fact, it is always closed when a synchronizing impulse is sent over the line, and it is always open when no synchronizing impulses are being sent.) Said local circuit includes the contact-screw 290 of the unison and synchronizer relay 289 and extends therefrom over the wire 120 and through the local battery 291 to the synchronizer-field and from thence over wire 108 to the unison-magnet 97 and back from said magnet over the wire 107 to the armature 288 of the unison and synchronizer relay 289.

In the recording-machine (see Fig. 19) there exist two local circuits—one of which is the synchronizer-circuit, which is closed by the heavy synchronizing impulses and includes the unison and synchronizer relay and the unison-magnet and the synchronizer and has its local battery 291, the arrangement of this circuit being the same in the recording-machine as the arrangement just described with relation to the same circuit in the transmitting-machine. The other local circuit of the recording-machine comprises in separate branches the positive and negative recording-styluses and the positive and negative polarized receiving-relays, and this circuit includes a local battery 304. The positive and negative branches of this local circuit are opened and closed by the contacts of the positive and negative polarized receiving-relays, and they are of course concerned in the operation of the respective positive and negative recording-styluses. The positive branch of said circuit may be traced as follows: from the armature 273 of the P+ receiving-relay 302 to the wire 270 and brush 264 and commutator-segment 260 and wire 263 to the P+ recording-stylus, and back from said stylus over the wire 267 to the continuous commutator-ring 259 and to the brush 266 and wire 272 and through the local battery 304 to the branch wire 301 and the contact-screw 281 of the P + receiving-relay 302. The negative branch of said local circuit may be traced as follows: from the armature of the N— receiving-relay 303 to the wire 270 and brush 265 through the commutator connection to the N— recording-stylus, and from thence over the wire 267 to the continuous commutator-ring 259 to the brush 266 and wire 272, through battery 304 to the branch wire 301 and to the contact-screw 281 of said N— receiving-relay 303. In the diagram Fig. 19 the positive branch of said circuit is shown closed, while the negative branch is open, as will be readily understood.

In the general operative features of my present invention and my improvements in facsimile-telegraphs it will be noted that the synchronism is effected by a magnetic synchronizer the armature of which may be directly connected to the main stylus-carrying shaft of the machine, said armature having a plurality of poles (herein shown as ten) which project with relation to a field comprising a corresponding number of poles, and therefore at every fractional part of a complete revolution of the main shaft corresponding to the number of poles said armature and field poles of the magnetic synchronizer will be opposite one another. Accordingly when the machine is in operation (at every one of said fractional parts of the revolution) a short impulse is simultaneously sent through the fields of the synchronizer of each machine which is connected in the line-circuit through the action of the synchronizer and unison-relay 289. This impulse will of course cause the synchronizer-field to become magnetic, and should the synchronizer-armature at that instant be not exactly opposite its polar center with respect to the field it will be drawn there by the magnetic force of the field, it being understood that the direct-current motor by which the main shaft of the machine is revolved is in motion. This action of the synchronizer will act upon the direct-current motors of the two or more machines in circuit as a governor and retain all of said machines at an exactly synchronous speed. It practice it is of course improbable that the armature of the synchronizer will be materially out of its proper relative position at the times of sending synchronizing impulses, if the direct-current motors and mechanisms of the several machines are properly or accurately adjusted relatively. In connection with the synchronizing impulses it will be noted that they are transmitted over the line by a momentary heavy current, the sending of this heavy current or synchronizing impulse at the specific determined intervals being of course effected through the medium of the synchronizing-commutator 171, it being understood that while the brushes are in contact with the segments thereof half of the line-battery is short-circuited, (during which short-circuiting the weaker writing impulses are sent,) and as the brushes pass over the open or insulated intervals between said segments said short circuit is broken and the full force of the battery is allowed to pass over the line. This heavy synchronizing-current will cause the synchronizer and unison relays 289 of all the machines which are comprised in circuit to attract their armatures, and thus complete the synchronizing short circuit of the respective machines during a period corresponding to the length of the heavy synchronizing line impulse. The relay 289 in my present invention and improvements serves a double purpose. It not only is a synchronizer-relay in the manner just stated, but it also serves the purpose of a unison-relay, it being understood in this connection that the local synchronizing-current, which is set up when the synchronizer-circuit is completed by the attraction of the armature 288 of the relay 289, also passes through the unison stop-magnet 97 and keeps the armature 98 thereof attracted during the operation of the machine, (so that it will be out of connection with the lock devices upon the main shaft,) the action of this stop mechanism and its construction being substantially the same as that shown and described in my hereinbefore-mentioned other application for patent. It will further be understood that inasmuch as the synchronizing impulses and the consequent action of the same upon the unison-magnet 97 occurs at very frequent intervals (in the present construction at every tenth of each revolution of the main shaft) the armature of the unison-magnet is maintained in continuously-attracted position, or at least the interval between the synchronizing impulses is not sufficiently long to enable a complete operation of the automatic stop mechanism which is operated by said unison-magnet.

In the sending of the writing impulses in my present invention and improvements, which are weaker impulses than the synchronizing impulses, as hereinbefore explained, the arrangement involves the two separate line-batteries, which are provided, preferably, at the transmitting-machine and which present opposite poles to the line, and two polarized relays, which are provided, preferably, at the recording-machine to again separate the currents. This results in a practical operation, as follows: When the styluses pass over the metallic foil message sheet or blank and make contact therewith, (there being at this point no insulating-ink upon the message-blank,) the local short circuit, hereinbefore described, which is completed through the two styluses in contact with the metallic foil message-paper and the latter, is maintained as long as the styluses are not contacting with insulating-ink, this local short circuit being established around the line-batteries and preventing any current from passing over the line to the receiving-machine. During the conditions just stated the two separate local short circuits hereinbefore described are simultaneously thrown around one-half of the line-batteries by action of the synchronizing-commutator 171, and in this way one half of the current of both batteries passes through the two styluses and the foil-paper and the other half of each battery is separately carried through the commutator 171 and the said two short circuits.

When the line-switch 300 is open, the main shafts of all the machines comprised in circuit are locked by the automatic stop mechanism, which is controlled by the armatures of the unison-magnets 97, said armatures being then of course released, inasmuch as no current is passing over the line. As before stated, it will be noted that these armatures would even remain released if the relatively weak writing-current were passing over the line, for the reason that the unison and synchronizer relays 289 for opening and closing the local circuit in which said unison-magnets 97 are included are only operated by the heavy synchronizing impulses. When the machines are thus stopped and at rest, the direct-current motors by which revolution is imparted to the main shafts may be continuously operating, the connection of said direct-motor mechanism with the shaft being by frictional contact, as hereinbefore stated, or if the apparatus is desired to be entirely out of use said direct-current motors may also be at rest. Assuming that the direct-current motors are running and the machine-shafts are locked by reason of the fact that the armatures of the unison-magnets 97 are in released position and the line-circuit is open at the switch 300, then to automatically start all the machines in unison it is only necessary to close the switch 300, which of course closes the line-circuit and causes the automatic release of the stop mechanism through the attraction by the unison-magnets 97 of their armatures and the consequent immediate starting of the main shafts of the machines. This latter action occurs as follows, the first current passing over the line when the line-circuit is closed, as above stated, being a heavy synchronizing impulse, which will operate the unison and synchronizer relays 289, and thus close the circuit which includes the unison-magnet 97: When the shafts of the machines are automatically stopped by the worm stop mechanism hereinbefore described, the relative position of the commutators and brushes is such that one of the transmitting-styluses will be in the center of the message sheet or blank, and the brushes of the synchronizing-commutator 171 will be in contact with the periods of insulation between the segments, the apparatus being thus in position for the sending of a synchronizing impulse, which position at the point of stopping is readily determined by the relative arrangements of the mechanism and which position will therefore of course exist at the initial time of automatically starting the machines. In the diagrammatic Fig. 18 the mechanism is illustrated as being at the stoppage-point. Now, taking this position of the machine as shown, and assuming that there is no insulating-ink on the initial portion of the message sheet or blank which has been introduced under the styluses, and the switch 300 being then closed to close the line-circuit, the synchronizing-current passes over the line and through the transmitting-machine, as follows: starting at the stylus N—, which is in the center of the message sheet or blank, to wire 78 and the segments of the stylus-commutator 72 to brush 80 and wire 87, through the N— battery 188 to the stylus short-circuiter and through the wire 295 to the ground 296. (At this position of the transmitting-machine mechanism it will be noted that the circuit of P+ battery 192 is open at the contact 216 of the stylus short-circuiter, which latter is, at this position of the commutator in relation to the brushes, a part of the circuit of said line-battery 192, it being noted that by reason of the wire 88 and brush 81 and short segment and connection thereof with the continuous ring 73, the circuit extends through brush 82 and wire 89 to the armature 196 of the stylus short-circuiter.) From the ground, the current, passing over said line-circuit, including the battery 188 and stylus N—, passes to the recording or receiving machine and over the wire 299 and synchronizer and unison relay 289 of the recording-machine and through the receiving-relays 302 and 303 and switch 300 to the synchronizer and unison relay 289 of the transmitting-machine and from thence over the wire 41 to the foil-paper brush-contact 36 and through the foil-paper back to the transmitting-stylus N—, thus forming a complete circuit over the line. It will be further noted that at this position and condition the short circuit around 13 one-half of the line-battery is open by reason of the relative position of the synchronizer-commutator 171 and its brushes, thus allowing the full force of the N— battery 188 to pass over the line. (In this position it will be noted that the stylus P+ is now out of circuit at the stylus-commutator 72 and that the circuit of P+ battery 192 is also open at the contact of the stylus short-circuiter, as hereinabove explained.) The heavy current now passing over the line will cause the armatures of the synchronizer and unison relays 289 of all the machines in circuit to be attracted, thus completing the local synchronizer-circuits of the respective machines, which will cause the armatures of the unison-magnets 97 to be attracted and release the stop mechanism from engagement with the main shafts of the machines, thereby permitting said shafts and stylus mechanism of the respective machines to instantly commence rotating in unison.

From the description in the foregoing paragraph it will be understood that the starting of the machines in unison is automatically accomplished by merely closing the line-circuit when the frictionally-connected direct-current motors are in operation and that the instant the line-circuit is closed (with the machines in their determined initial position, as above stated) a heavy current will be transmitted, which will release the stop mechanisms of the various machines and enable them to instantly start in unison.

The heavy initial synchronizing impulse above described, which passes, as stated, through the polarized receiving-relays and over the line-wire 299, will of course actuate the relay which corresponds in polarity to the current. This current, being from N— battery 188, as explained, will therefore operate the N— receiving-relay 303 and close at said relay that branch of the local stylus-circuit of the recording-machine; but inasmuch as said local circuit is at this time open at the contact of the brush 265 with the insulated period 262 between the segments of the stylus-commutator of the recording-machine (see Fig. 19) no actuation of the recording-stylus N— involved in said branch of the local stylus-circuit of the recording-machine will be caused by said operation of the N— relay 303, and consequently no marking by said stylus upon the message-paper during the period of the synchronizing impulse will be made. If, however, the period of insulation 262 was of an extent not equal to the full duration of the synchronizing impulse and said N— branch of the local stylus-circuit of the recording-machine was entirely closed during any part of the duration of the synchronizing impulse, thus bringing said N— stylus in operative position and relation, then by reason of the relative arrangements of the reversed-polarity connections existing between the transmitting and recording sets of styluses the N— recording-stylus is now in position at the edge of the message-paper, so that any operation of the same and consequent marking upon the message-paper, which will produce a mark resulting from the syhchronizing impulse, will be only at the edge of the message-paper and will not in any way conflict with the recorded matter to be produced thereon. Furthermore, the relative position may be such that the N— stylus will not be at this point at all in contact with the message-paper, and will therefore make no mark by reason of actuation during the synchronizing impulse. Any markings, however, resulting from the actuation of the recording-styluses by the ordinary synchronizing impulse sent initially in the starting of the machines or during the transmitting and recording operation of the same would always be at the side of the recording message-paper, since the synchronizing impulses are sent through the transmitting-stylus which is in the center of the foil-paper message-blank, and the recording-stylus of corresponding polarity is always at that time in a relative edge position with relation to the message-paper 218. The synchronizing impulse just above described will only continue for a period corresponding to the period of insulation between the segments of the synchronizing-commutator 171, and instantly after this is passed in the operation of the machine the transmitting-stylus P+ will then come into circuit by reason of the movement of the brush 81 onto the segmental commutator connection with said stylus, and then the local short circuit of the transmitting-machine, which is completed between the styluses N— and P+ and through the foil-paper, and which is hereinbefore fully described, will be established, and no current will pass over the line while this condition is continued, and neither of said styluses N— and P+ contact with any insulating-ink on the foil-paper.

In the operation of transmitting writing impulses the pair of said styluses (N— and P+) being in operative position with relation to the foil-paper the local short circuit just mentioned will be maintained only so long as both of said styluses are neither one in contact with insulating-ink; but it is instantly broken when either one of said pair of styluses contacts with insulating-ink. Thus, for instance, if the stylus N— contacts with insulating-ink said short circuit is instantly broken and a writing impulse is sent over the line. This occurs as follows: The circuit connection of the N— battery 188 is open at the insulated ink-contact of said N— stylus which is connected with said battery, while the P+ stylus is now in line-circuit through the wire 78, and its segmental connection with the stylus-commutator of the transmitting-machine and the brush 81, which is now in contact with said segment, and over the wire 88, through the P+ battery 192, (half of said battery being now short-circuited through the synchronizer-commutator 171,) and over the half-winding 88 of the coils of the stylus short-circuiter and the wire 295 to the ground 296 and from the ground over the line-wire 299 and through the polarized receiving-relays and switch 300 to the wire 41 and foil-paper brush-contact 36 and through the foil-paper to said stylus P+. This writing-current passes through the synchronizer and unison relays 289, but does not actuate the same, as will be readily understood. Said current, being from the P+ battery 192, will actuate the P+ receiving-relay 302, but will not actuate the N— relay 303. This actuation of the P+ relay will close the P branch of the local circuit of the recording-machine at the contact 281 of said relay, said closed circuit being as follows: from the armature of the receiving-relay over the wire 270 to the brush 264 in contact with the segments of the stylus-commutator of the recording-machine and over the wire 263 to the P+ recording-stylus and back from the latter over the wire 267 to the continuous ring 259 of said commutator and to the brush 266 and wire 272 through the local-circuit battery 304 and over wire 301 to the contact-screw 281 of said P+ relay 302. Said stylus branch circuit of the recording-machine will thus operate by action of the P+ relay 302 to actuate the P+ recording-stylus for a period corresponding exactly in duration to the length of time the transmitting-stylus N— remains in contact with insulating-ink. The contact of the N— transmitting-stylus with insulating-ink thus causes a writing impulse of opposite polarity to pass over the line and cause the operation of the recording-stylus of a polarity corresponding to said impulse, and consequently of a polarity opposite to that of said stylus which is in contact with the insulating-ink. In an exactly corresponding manner, as will be readily understood, contact of the stylus P+ with insulating-ink while the stylus N— is in contact with the foil-paper would send a writing impulse opposite in polarity to said transmitting-stylus P+, and therefore corresponding in polarity to the transmitting-stylus N—, which would cause an actuation of the recording-stylus N—. Inasmuch as the writing impulse transmitted is always of opposite polarity from the stylus which is in contact with the insulating-ink, and yet the recording upon the message-paper must be in exactly the same relative position as the insulated-ink markings upon the foil-paper sheet or blank, therefore the relative positions of the styluses of opposite polarity are respectively alternated in the transmitting and recording machines—that is to say, when an N— transmitting-stylus is in the center of the foil-paper sheet a P+ recording-stylus will be in the center of the recording-sheet, and when a P+ transmitting-stylus is at the side of the foil-paper an N— recording stylus will be at the side of the recording-sheet.

If both of the styluses in operative position in the operation of the machine are simultaneously in contact with insulating-ink, no writing impulse will pass over the line, for the reason that the line circuit connection of both line-batteries is then broken at the insulated ink contact of said respective styluses; but this condition in practice very infrequently occurs, and would even under conditions of great frequency make no appreciable difference in the facsimile transcribing of the markings in insulating-ink upon the message sheet or blank, as the periods of such simultaneous contact of both operative styluses with insulating-ink would be infinitesimally short.

As hereinbefore stated, the synchronizing impulse is in the relative construction and arrangement of the commutators and brushes and styluses, as herein illustrated, always sent through the transmitting-stylus which is in the center of the foil-paper message sheet or blank and which is therefore of a polarity corresponding to that of the line-battery connection of said stylus. Inasmuch as when the two transmitting-styluses N— and P+ are in operative position the stylus N— in the center of the message sheet or blank may contact with insulating-ink at the moment of the sending of a synchronizing impulse it is therefore necessary to provide for the sending of writing and synchronizing impulses at the same time, and it is then consequently necessary to reverse the polarity of the synchronizing impulse sent at this time, so that it will be of a polarity opposite from that of the stylus in the center of the message sheet or blank, because the circuit connection of the latter is broken at the insulated ink contact. Taking the general position of the commutators and brushes and styluses at the moment of sending a synchronizing impulse, as represented in Fig. 18, and assuming that at this moment the center stylus N— is in contact with insulating-ink, thereby precluding the passage of a synchronizing-current through the same, the conditions are as follows: First, it will be noticed that the circuit of the N— line-battery 188 is broken at the insulated ink contact of the N— stylus and that the circuit of the P+ line-battery 192 is open at the stylus-commutator by reason of the contact of the brush 81 with the short segment, (the P+ stylus being now out of connection with the circuit of the P+ battery 192, inasmuch as the brush 81 is not in contact with the stylus-commutator segment which is connected with said P+ stylus,) and is also open at the armature 196 of the stylus short-circuiter, said brush 81 and the short segment with which it is in contact being in connection with the commutator-ring 73 and the brush 82 and the wire 89, which connects with said armature of the stylus short-circuiter; but the instant the N— stylus contacts with insulating-ink, with the circuit conditions as just stated, both of the line-battery circuits being then entirely open, no current will pass over the wires 87 and 88 and the differential coils of the stylus short-circuiter, and there being, consequently, no further attraction of the armature 196 the latter will contact with the contact-screw 216, thus establishing a line-circuit through the closed portion of the local circuit of the transmitting-machine. Now the P+ line-battery 192 will be in circuit, (the circuit of the N— line-battery 188 being still open at the insulated ink-contact of the stylus N—,) and the full force of said battery 192 (the short circuit through the synchronizer-commutator 171 for one-half of said battery 192 being now open) will pass over the wire 88 to the brush 81 and the short stylus-commutator segment and the connecting plate or wire thereof to the commutator-ring 73 and to the brush 82 and wire 89 to the armature 196 of the stylus short-circuiter and the contact-screw 216 and over the wire 297 and the coils thereof at the stylus short-circuiter and the switch 298 and to the wire 41 and through the synchronizer and unison relay 289 of the transmitting-machine to the line-wire 299 and through the polarized receiving-relays of the recording-machine and the unison and synchronizer relay 289 of the recording-machine to the ground 296 and back through the ground to the stylus short-circuiter through the ground-wire connection thereof, 295, and over the one-half winding 88 of the differential coils of the stylus short-circuiter which are in connection with the P+ line-battery 192 and over said wire 88 through said battery 192, thus completing a line-circuit over which the synchronizing and writing impulse will pass at the same time. This synchronizing and writing impulse, being of a polarity corresponding to the battery 192, will operate the corresponding P+ receiving-relay 302, and thus cause an operation of the P+ recording-stylus, which is then in the center of the message-paper at the recording-machine, as will be readily understood, whereby said recording-stylus will make a mark upon the message-paper corresponding exactly to the period during which the N— transmitting-stylus is on insulating-ink, and at the same time the synchronizing impulse will be transmitted for actuation of the synchronizer and unison relay, as hereinabove explained. The non-inductive resistance 307, which may be connected with the wire 297, is not sufficiently strong to materially reduce the synchronizing-current which is sent over the special circuit just above described.

As soon as the N— stylus passes off the insulated ink contact the second local short circuit of the transmitting-machine, as hereinbefore described, will be established through the foil-paper and N— stylus and stylus-short-circuiter armature and the wires 297 and 41 and their connections comprised in said local short circuit, as previously stated, and this momentary short circuit will be broken by the attraction of the armature 196 by the differential coils of the stylus short-circuiter, so that the transmission of the writing impulses can then be accomplished in the ordinary manner over the regular line-circuit.

In the sending of the writing and synchronizing impulses at the same time in the manner above described it is impossible that the mark produced by the P+ recording-stylus would be greater in extent than the actual extent of the insulating-ink over which the N— transmitting-stylus is at this time passing, even though the period of the synchronizing impulse would be longer than said period of contact with the insulating-ink, for the reason that as soon as the N— transmitting-stylus passes off contact with the insulating-ink and into contact with the foil-paper then instantly the normal conditions are resumed. The synchronizing impulse, should it be of a duration continued beyond this point, would then pass in the normal manner through the N— stylus, and therefore be of a polarity corresponding to said N— stylus and capable of causing no effect whatever upon the P+ recording-stylus. The polarity of the synchronizing impulse is thus only reversed during the actual period that the stylus in the center of the foil-paper is contacting with insulating-ink. It will be noted that in the circuit arrangements for the transmission of synchronizing and writing impulses at the same time, while the transmitting-stylus which is in the center of the foil-paper is contacting with insulating-ink, under which the polarity of the synchronizing impulse will be reversed, as stated, the polarity of the transmitting-stylus in contact with the insulating-ink is also reversed now as well as under normal conditions of transmission, so that the respective actuation of the recording-styluses in the transmission of synchronizing and writing impulses at the same time is identically the same as when such writing impulses are transmitted irrespective of the synchronizing impulses.

The special purpose of the coils of the stylus short-circuiter, to which is connected the wire 297, is as follows: When the writing impulses are being transmitted at the same time as the synchronizing impulses, the current will first entirely leave the differential coils of the stylus short-circuiter, (there then being no current passing over the wires 87 and 88, as before explained, the circuit of both line-batteries being open,) thus permitting the armature 196 of the stylus short-circuiter to recede from the differential coils and make contact with the contact-screw 216. This contact closes the circuit of the line-battery, which is now in operative connection, and establishes the line-circuit over a part of the local circuit of the transmitting-machine, as hereinbefore described, which circuit now comprises the coils of the wire 297 and also the differential coils, which are comprised in the stylus short-circuiter. Consequently if the magnetic coils of the wire 297 were not provided with respect to the stylus-short-circuiter armature 196 the armature would then be attracted by the differential coils and again open the contact 216, which would open the special line-circuit just mentioned as soon as the same had been closed, and a vibration of said armature would be set up. No continued closure of the circuit would thus be maintained, and the stylus-short-circuiter coils of the wire 297 therefore serve to retain the armature against the contact-screw 216 during the period when current is passing through the stylus short-circuiter for the transmission of writing and synchronizing impulses at the same time.

As above mentioned, the transmitting-stylus which is at the center of the foil-paper and in contact with insulating-ink will not only not always pass over an insulation that is as wide as the impulse period of insulation between the segments of the synchronizing commutator 171, but under some circumstances the width or period of insulation may be very short, or there may be two or three periods of such insulation close together and comprised in one single period of synchronizing impulse. It will therefore be understood that the reversal of the circuit conditions with respect to the reversing of the polarity of the synchronizing impulse when the synchronizing impulse and a writing impulse are sent at the same time may occur one or more times during the sending of a single synchronizing impulse. Each time during the sending of a synchronizing impulse that the center stylus passes from insulating-ink and into contact with the foil-paper the momentary local short circuit hereinbefore mentioned will be established, and then if the stylus should again contact with insulating-ink before the synchronizing impulse is completed the special line connections enabling the simultaneous sending of writing and synchronizing impulses will then be again established. With respect to said momentary short circuit I have hereinbefore explained in detail the full path of said circuit, setting forth that the current over this circuit will pass through the contact of the stylus short-circuiter and through the magnetic coils of the wire 297. This current being quite heavy (inasmuch as it includes the full force of both line-batteries, the battery of the stylus, which is in the center of the foil-paper, being now in circuit by reason of the contact of said stylus with the foil-paper and the other battery being already in circuit) and going over the entire winding of the differential coils of the stylus short-circuiter, which latter coils are much stronger than the coils of the wire 297, leading from the contact 216, will cause the armature 196 to be attracted by the differential coils and will thus operate to break the contact. Then of course as soon as this momentary short circuit is thus broken and the current thereof no longer passes through the differential coils of the stylus short-circuiter there then passes the line-circuit current of the line-battery then in operation over one-half the windings of the differential coils over either the wires 87 or 88, which will be sufficient to attract the armature after said momentary local short circuit passing over the magnetic coils of the wire 297 is broken. The armature 196 will then remain attracted and away from the contact 216 until the stylus in the center of the foil-paper again passes into contact with insulating-ink during the period of a synchronizing impulse. When no current is passing over the magnetic coils of the wire 297 during the ordinary sending of writing impulses with one-half the force of a line-battery, this current passing through one-half the windings of the differential coils of the stylus short-circuiter over either the wires 87 or 88 is sufficient to retain the armature 196 attracted and away from the contact 216, and when the full force of one of the batteries is passing through said one-half winding of the differential coils in the sending of an ordinary synchronizing impulse the armature will of course also remain attracted. When the full force of both batteries is passing over the full differential windings of the differential coils and over the coils of the wire 297 during the momentary short circuit just mentioned, then the differential coils being larger, and consequently stronger, the armature will be attracted and the contact broken. During the period when a synchronizing and writing impulse is sent at the same time and the special line-circuit is established therefor through the stylus short-circuiter and through a portion of the local circuit of the transmitting-machine the full force of one of the batteries is of course passing over the magnetic coils of the wire 297 and also over one-half the winding of the differential coils in its return through the ground connection; but the armature will not then be attracted by the differential coils and will remain in contact with the contact-screw 216, by reason of the fact that a current of the same force is passing over the full winding of the coils of the wire 297 and over only one-half the differential winding of the differential coils, the first coils being therefore larger or stronger than the part of the differential coils which is receiving current, though even if the relative windings of the said coils were equal the equality of the current would result in the armature remaining in its contact position. The non-inductive resistance 307, which may be in connection with the wire 297, is specially provided for the purpose of reducing the strong current (that of both the line-batteries) which passes over the momentary local short circuit, and thus prevent the full force of the same from passing through the foil-paper and styluses. It will be understood that though the wire 297 is in connection with the wire 41 from the foil-paper brush-contact and in connection with the line through said wire 41 the heavy current during the momentary short circuit will follow the short path, and consequently not pass over the line and through the synchronizer and unison-relay of the transmitting-machine, so that no actuation of said relay will result from this momentary heavy current.

The purpose of the switch 298 in the wire 297 is as follows: When the line-switch 300 is open and all current thus taken from the line, all the machines in circuit will be stopped by automatic operation of the unison-magnets 97, which will of course then release their armatures; but in the determined stoppage position of the transmitting-machine the full force of the current of both batteries would be short-circuited through the transmitting-machine if the center stylus was in contact with foil-paper. This circuit is the same as the momentary short local circuit and is caused by the fact that as soon as the line is open all current is taken from the differential coils of the stylus short-circuiter, and the armature 196 will then automatically make the contact 216. This contact instantly completes said local short circuit, (the path of this circuit has been previously fully set forth,) and as soon as said circuit is completed and the current therefore passes through the differential coils the armature will be again attracted. As soon as it is attracted, and thus breaks the circuit, the current is again taken from the differential coils and it will again make the contact 216. In this manner the armature will vibrate and continuously make and break said local circuit, over which the current of both the line-batteries will pass. Accordingly the switch 298 is provided, so that this local circuit may be opened when desired. The local full double-battery circuit just mentioned will be continuously made and broken when the switch 298 is closed and the line is open, whereas the same circuit when concerned in the sending of a synchronizing and writing impulse at the same time will remain open at the completion of said latter condition, by reason of the fact that the line being of course at that time closed the current for the transmission of the writing impulses will pass over one-half the winding of the differential coils of the stylus short-circuiter, and thus retain the armature 196 in attracted position. If it is not desired to send synchronizing and writing impulses at the same time, the switch 298 may be left open while the line is closed. It will be noted that the wire 297 forms a connection with respect to two circuits, one the momentary local short circuit and the other the special line-circuit, which is established for the sending of synchronizing and writing impulses at the same time.

It will be further understood that it is not absolutely necessary to employ a direct-current motor for effecting the operation of the machines. Any suitable or adapted mechanism or source of power may be employed to operate the machines, it being of course advisable that said operative power should be equalized as nearly as possible at the sending and receiving machines.

Referring to the receiving or recording machine, (see Fig. 19,) it will be noted that the line-current impulses, whether they are writing or synchronizing impulses, do not pass through the recording-machine. The line-currents only pass through the receiving-relays 302 and 303 (which are of the polarized type) and through the synchronizer and unison relay 289, (which is of the ordinary type.) The relay 289 is adjusted so that it will only be actuated by the heavy synchronizing impulses. The polarized relays are adjusted so that they are respectively actuated by the relatively weak writing impulses of a corresponding polarity. The polarized relays will of course also be actuated by the heavy synchronizing impulses of corresponding polarity; but this does not affect the perfect or desired operation of the recording-styluses, as hereinbefore fully explained. The synchronizing and unison relays 289 are of course operated by the synchronizing impulses of either polarity, while the polarized receiving-relays operate only one at a time and by currents of their own respective polarity. The writing impulses do not themselves actually operate the recording-styluses. They merely actuate the receiving-relays to open and close the respective branches of the local stylus-circuit of the recording-machine, and the actual operation of the recording-styluses is effected by current from the local battery 304, comprised in said local circuit.

I may vary the construction of the ten-pole synchronizer in any suitable or adapted manner, and I may of course resort to divers other details of modification and variation in the general structure and arrangement of the invention without departing from the general spirit and scope and without affecting the chief features thereof, one of the principal features being the principle and construction by which synchronizing impulses and writing impulses are sent over the same wire at the same time and by which writing impulses may be transmitted while the synchronizing impulse is being transmitted without disturbing the effective operation of either impulse. I therefore do not, in view of the manifest variations and modifications which may be resorted to, confine myself to the precise features of construction and arrangement as herein illustrated and described; but I reserve the right to all such variations and modifications in the detail structure of the machine and in the relative arrangement of both mechanisms and circuits as properly fall within the scope of my invention and the terms of the following claims.

Having fully described my invention, I claim as new and desire to secure by Letters Patent—

1. In a facsimile-telegraph, a message-paper-feed mechanism embodying a swinging platen, means for operating said platen in said movement, and means for guiding the platen during its movement whereby it is always maintained in a uniform horizontal plane.

2. In a facsimile-telegraph, a message-paper-feed mechanism embodying a swinging platen, means for operating the platen in said movement, and set means for governing the movement of said platen at a determined point with relation to its operative projection.

3. In a facsimile-telegraph, a message-paper-feed mechanism embodying a swinging platen, means for operating the platen in said movement, means for guiding the platen in its swinging movement whereby it is always maintained at a uniform horizontal plane, and set means for limiting the movement of the platen at a determined point with respect to its operative projection.

4. In a facsimile-telegraph, a message-paper-feed mechanism embodying an initial feed-table in set position, a movable platen operating in rear of said table, and means for operating said platen to raise it above the plane of the table.

5. In a facsimile-telegraph, a message-paper-feed mechanism embodying an initial table having a fixed position, and a movable platen arranged in rear of said table and normally projecting above the plane thereof.

6. In a facsimile-telegraph, a message-paper-feed mechanism embodying feed-rolls, carrier bands or strips passing around said rolls, an initial feed-table having a stationary position with relation to said rolls and bands, and a platen movable with relation to said table and said rolls and bands.

7. In a facsimile-telegraph, a message-paper-feed mechanism embodying guide means over which the message-paper is adapted to pass, and a platen portion comprised in said guide means and projectable above the normal plane thereof.

8. In a facsimile-telegraph, a message-paper-feed-mechanism, a swinging platen, crank rock-shafts connected with and carrying said platen, and adjustable devices connected with said crank rock-shafts and moving in a plane coincident with the line of movement of the platen.

9. In a facsimile-telegraph, a message-paper feed mechanism embodying a swinging platen, crank rock-shafts connected with and carrying said platen, a cross-piece or block connecting said crank rock-shafts, and devices for moving said connecting-blocks in the plane of movement of the swinging platen.

10. In a facsimile-telegraph, a message-paper-feed mechanism embodying a swinging platen, means for operating the platen in said movement, means for maintaining said platen at a uniform horizontal plane during its movement, and means for guiding the platen in said movement, said guide means having a segmental path of travel.

11. In a facsimile-telegraph, a message-paper-feed mechanism embodying a swinging platen, crank rock-shafts connected with and carrying said platen, cross-pieces or blocks connecting said crank rock-shafts, means for moving said connecting-blocks in the line of travel of the swinging platen, and segmental guides for maintaining the horizontal position of the platen during its swinging movement.

12. In a facsimile-telegraph, a message-paper-feed mechanism embodying a swinging platen, means for carrying the platen in said swinging movement, means connecting said carrying means and operating in a line of movement corresponding to that of the platen, and operating devices having a fixed position relative to the line of movement of said connecting means and platen and operatively connected to said connecting means.

13. In a facsimile-telegraph, a message-paper-feed mechanism embodying a swinging platen, crank rock-shafts connected with and carrying said platen, a cross-piece or block connecting said crank rock-shafts, means for adjustably moving said connecting-block, and a spring circuit contact-brush bearing with relation to said movable platen.

14. In a facsimile-telegraph, a message-paper-feed mechanism comprising a swinging platen, feed-rolls carrying bands or strips arranged with relation to the operative projection of the platen, an initial guide-table arranged in front of said platen, means for operating the platen in its adjustable movement, and a circuit contact device bearing with relation to said movable platen.

15. In a facsimile-telegraph, a message-paper-feed mechanism embodying a movable platen and feed-rolls, operative mechanism, gear connection between the feed mechanism and said operative mechanism, means for operating the feed mechanism independent of said operative mechanism, and means for independently operating the platen in its adjustable movement.

16. In a facsimile-telegragh, a message-paper-feed mechanism embodying a movable platen, a stylus carrying and operating mechanism, a direct operative connection between said feed mechanism and stylus carrying and operating mechanism, means for independently operating said feed mechanism, and means for independently operating the platen in its adjustable movement.

17. In a facsimile-telegraph, a message-paper-feed mechanism embodying a table or platen over which the message-paper is adapted to pass in an advancing movement, a supplementary guide-table arranged beneath said table or platen and leading forwardly, and a guide-roll at the intersection of the rear end of said main table or platen and the initial end of said guide-table, whereby the message-paper travels and is guided inwardly and outwardly.

18. In a facsimile-telegraph, a message-paper-feed mechanism embodying a table or platen over which the message-paper is adapted to pass in an advancing movement, and a guide-table arranged beneath said main table or platen and leading forwardly, whereby the message-paper is guided outwardly or forwardly in a return movement, said guide-table having a cutting edge at its front, for the purpose set forth.

19. In a facsimile-telegraph, a main rotary shaft, a plurality of stylus devices carried in successive series by said shaft, a commutator carried by the shaft and divided into two segmental ring sets and a continuous ring, circuit connections between said respective stylus devices and the respective segments of said ring sets, brush-contacts for each of said commutator ring sets, and circuit connections with said respective brushes.

20. In a facsimile-telegraph, a main rotary shaft, a plurality of stylus devices carried in successive series by said shaft, a commutator carried by the shaft and divided into two separate segmental ring sets and a continuous ring set, each segmental ring set having a short segment between its main segments, circuit connections whereby said short segments are connected in series with said continuous ring, circuit connections between the respective stylus devices and the main segments of the segmental ring sets, brush-contacts for each of said commutator ring sets, and circuit connections for the respective brushes.

21. In a facsimile-telegraph, a plurality of stylus devices arranged in successive series, a commutator device divided into a plurality of contact sets, each contact set being divided into a plurality of contacts, circuit connections extending between said stylus devices and said commutator-contacts, the relative arrangement being such that the stylus devices are alternately connected successively to the respective contacts of the plurality of contact sets, and circuit connections between said respective contact sets and opposite line-battery poles.

22. In a facsimile-telegraph, a plurality of stylus devices arranged in successive series, in combination with a commutator device divided into a plurality of contact sets and a continuous contact, said contact sets being divided into a plurality of contacts and into supplementary contacts intermediately with respect to said main contacts, and said supplementary contacts being connected in series with the continuous contact, circuit connections connecting the set of stylus devices alternately and successively with the main contacts of the plurality of contact sets, and circuit connections extending to the respective commutator sets.

23. In a facsimile-telegraph a platen, a plurality of stylus devices arranged in successive series, means for bringing a plurality of said stylus devices simultaneously into operative position or relative arrangement with respect to the said platen, and circuit connections extending from opposite battery-poles to the styluses which are operated simultaneously, said circuit connections being alternated with respect to said styluses.

24. In a facsimile-telegraph, a set of stylus devices successively arranged in circular series, means for maintaining the message sheet or blank in contact with a plurality of said stylus devices simultaneously, circuit connections with said stylus devices thus in operative contact, and means for alternating the polarity of the respective circuit connections of said operative stylus devices.

25. In a facsimile-telegraph, a plurality of stylus devices arranged in successive series, two line-batteries of opposite polarity and circuit connections extending respectively from said line-batteries and alternately connected with the respective stylus devices, whereby said series of stylus devices is divided into two alternately-arranged sets of opposite-polarity connection.

26. In a facsimile-telegraph, a rotary shaft, stylus devices carried by said shaft, a circular magnetic field having a plurality of inwardly-projecting poles, circuit connections for said field, and a circular synchronizer-armature directly carried by said shaft and having a plurality of outwardly-projecting poles corresponding in number to the field-poles.

27. In a facsimile-telegraph, a rotary shaft, stylus devices carried by said shaft, an electromagnetic field, a rotary armature directly carried by said shaft and having its poles corresponding in number to those of the field, and means for sending an electrical synchronizing impulse to said field at those periods in the revolution of the shaft when the poles of said armature and field are approximately in opposite relation.

28. In a facsimile-telegraph, a rotary shaft, stylus devices carried by said shaft, an electromagnetic field having a plurality of poles, a rotary armature carried directly by said shaft and having a plurality of poles corresponding in number to those of said field, circuit connections with said field, and means for closing said circuit at set periods corresponding in number to the poles of said field and coincident with the period when the poles of the armature and field are in approximately opposite relation.

29. In a facsimile-telegraph, a rotary shaft, stylus devices carried by said shaft, an electromagnetic synchronizer mechanism connected with said shaft, an electromagnetic stop mechanism having an operative engagement with said shaft, and a circuit connection comprising both said synchronizer and stop mechanisms.

30. In a facsimile-telegraph, a rotary shaft, stylus devices carried by said shaft, an electromagnetic synchronizer mechanism directly carried by said shaft, an electromagnetic stop mechanism having an operative engagement with the shaft, and circuit connections comprising in the same circuit both the synchronizer and stop mechanisms.

31. In a facsimile-telegraph, stylus devices, means for operating the stylus devices, synchronizer mechanism connected with said operating means, circuit connections for the stylus devices and synchronizer mechanism, means for dividing the current force over said circuit connections, means for sending a writing impulse with part of the current force through said stylus-circuit connections, and means for sending a synchronizing impulse with full current force through the synchronizing-circuit connections.

32. In a facsimile-telegraph, stylus mechanism, synchronizing mechanism in connection with said stylus mechanism, circuit connections for said stylus and synchronizing mechanisms, means for dividing the current force of said circuit connections, means for sending a writing impulse with a relatively weak current through said stylus-circuit connections, and means for sending a relatively strong current force through said synchronizing-mechanism circuit connections.

33. In a facsimile-telegraph, a rotary shaft, stylus mechanism operated by said shaft, electromagnetic synchronizing mechanism connected with said shaft, electromagnetic stop mechanism having an operative connection with said shaft, circuit connections comprising in series the electromagnetic synchronizing mechanism and the electromagnetic stop mechanism, and means for retarding the engagement of said electromagnetic stop mechanism with the shaft.

34. In a facsimile-telegraph, a rotary shaft, stylus mechanism operated by said shaft, electromagnetic synchronizing mechanism connected with the shaft, electromagnetic stop mechanism having an engagement with the shaft, circuit connections comprising in series the electromagnetic synchronizing mechanism and the electromagnetic stop mechanism, means for sending an electrical synchronizing impulse at determined intervals over said circuit, the arrangement being such that said synchronizing impulses operate to maintain the armature of the electromagnetic stop mechanism in attracted position, and means for retarding the release action of said armature, the arrangement being such that when said armature is released the stop mechanism operatively engages the shaft.

35. In a facsimile-telegraph, stylus devices, means for operating the same, stop mechanism comprised in said operating means, electrically-actuated synchronizing mechanism connected with said operating means, circuit connections for said synchronizing mechanism, and an electromagnetic stop mechanism comprised in said circuit and operated by the synchronizing impulses sent over the same to attract its armature, said armature being adapted when released to engage the stop mechanism comprised in the stylus-operating mechanism.

36. In a facsimile-telegraph, stylus mechanism, synchronizing mechanism in connection with said stylus mechanism, circuit connections for said stylus and synchronizing mechanisms, means for sending a writing impulse of a relatively weak current force through said stylus-circuit connections, means for sending a relatively strong current through said synchronizing-mechanism circuit connections, a transmitter, and devices operating in connection therewith for controlling the intervals in said impulses.

37. In a facsimile-telegraph, a rotary shaft, stylus mechanism operated thereby, an electromagnetic field surrounding the shaft, a circular magnetic armature directly carried by said shaft and having its poles projecting with relation to the poles of said field, circuit connections for said field, and means for sending electrical impulses to the field when the poles of the armature and field are in approximately opposite relation.

38. In a facsimile-telegraph, a rotary shaft, stylus mechanism operated thereby, an electromagnetic motor for operating said shaft, the armature of said motor being slidably mounted upon and carried by the shaft, frictional contact devices carried by the shaft and adapted to be engaged by said armature, and means for forcing said armature in its slidable movement to such contact.

39. In a facsimile-telegraph, a rotary shaft, stylus mechanism operated by said shaft, motor mechanism for operating said shaft, said motor mechanism embodying a member slidably mounted upon the shaft and adapted to operate independently thereon, contact devices upon the shaft engaged by said motor member, ball-bearing devices carried by the shaft and sustaining said slidable motor member, and means for forcing said motor member into operative relation with respect to said contact devices.

40. In a facsimile-telegraph, a rotary shaft, stylus mechanism operated by said shaft, an electromagnetic motor mechanism for operating said shaft, the armature of said motor mechanism being slidably mounted upon and carried by the shaft and independently revoluble thereon, contact devices carried by the shaft and adapted to be engaged by said armature, ball-bearings slidably mounted upon and carried by the shaft and operating to sustain said armature, and means for forcing said armature and its bearings into operative position with relation to said contact devices.

41. In a facsimile-telegraph, a rotary shaft, stylus mechanism operated thereby, motor mechanism embodying an armature slidably mounted on said shaft and revoluble independently thereon, contact devices carried by the shaft and adapted to be engaged by said armature, and spring-actuated ball-bearing devices sustaining the armature upon the shaft in operative relation to said contact devices.

42. In a facsimile-telegraph, the combination, with the stylus-operating shaft, of an electromagnetic motor having its field surrounding said shaft and embodying concave pole-pieces at the top, the armature of said motor being directly mounted upon the shaft and slidable thereon with relation to the width or projection of said concave pole-pieces.

43. In a facsimile-telegraph, the combination, with the stylus-carrier shaft, and the framework embodying a bottom portion or plate, as at 109, of an electromagnetic motor having its field-magnets arranged in series surrounding said shaft and provided with concave pole-pieces at the top, said motor having its field suspended from said bottom plate 109 by connection of the pole-pieces therewith, and the motor-armature mounted upon said stylus-carrier shaft and operating within the area of said concave pole-pieces.

44. In a facsimile-telegraph, a rotary shaft, stylus mechanism operated by the shaft, a commutator comprising a segmental ring set and a continuous ring, the respective segments being connected with said continuous ring, a circuit comprising both the segmental and continuous commutator sets, and a circuit comprising the stylus mechanism and connected with said first circuit, substantially as and for the purpose set forth.

45. In a facsimile-telegraph, a rotary shaft, stylus devices arranged in successive series and carried by said shaft, a stylus commutator device connected with the shaft and comprising two contact sets divided into separate contacts, the relative arrangement being such that the contacts of one set intersect the period between the contacts of the other set, circuit connections extending in alternate arrangement from the individual stylus devices to the separate contacts of said respective sets, electromagnetic synchronizing mechanism connected with said shaft, a synchronizing-commutator connected with the shaft and comprising two contact sets one of which is divided into separate contacts corresponding in number to the contacts of both sets of the stylus-commutator, a circuit connection comprising both contact sets of the stylus-commutator and connected with said circuit connection of the synchronizing-commutator, and a circuit connection for the synchronizer connected with said commutator circuit connections, substantially as and for the purpose set forth.

46. In a facsimile-telegraph, the main rotary shaft, stylus devices arranged in successive series and carried by said shaft, the stylus-commutator carried by the shaft and embodying the two segmental ring sets with the intermediate short segments between the main segments of said sets and the continuous ring, said intermediate short segments of both sets being connected in series with said continuous ring, the circuit connections extending from the respective stylus devices alternately to the main segments of the respective sets of the stylus-commutator, an electromagnetic synchronizer connected with said shaft, the stylus-commutator carried by the shaft and comprising two segmental ring sets and the two continuous rings respectively connected with the individual segments of said respective ring sets, the line-batteries of opposite polarity, the alternate circuit connections between the segmental ring sets of the stylus-commutator and said respective line-batteries, the circuit connections between the ring sets of the synchronizing-commutator and said respective line-batteries, a line-circuit connection with the continuous ring of the stylus-commutator, and a line-circuit connection with the synchronizer, substantially as and for the purpose set forth.

47. In a facsimile-telegraph, the main rotary shaft, stylus devices arranged in successive series and carried by said shaft, a stylus-commutator embodying two segmental ring sets, the circuit connections extending from the respective stylus devices alternately to the segments of the respective segmental sets of the stylus-commutator, an electromagnetic synchronizing mechanism connected with said shaft, the synchronizing-commutator carried by the shaft and comprising the two segmental ring sets and the two continuous rings respectively in connection with the segments of said segmental ring sets, the line-batteries of opposite polarity, the circuit connections between said respective line-batteries and the respective segmental sets of the stylus-commutator, the circuit connections between the said respective line-batteries and the ring sets of the synchronizing-commutator and the circuit connections of the stylus-commutator, and a line-circuit connection with the synchronizer, substantially as and for the purpose set forth.

48. In a facsimile-telegraph of the class described, a "stylus short-circuiter" device embodying an armature and contact and having coils at opposite sides of said armature, the coils at one side being differentially wound and having a line-circuit connection, said differential windings being respectively connected with individual stylus devices, and the other coils and contact having a line-circuit connection and circuit connections from the armature to the said line-circuit connection, substantially as and for the purpose set forth.

49. In a facsimile-telegraph of the class described, the stylus short-circuiter device having an armature and coils at opposite sides thereof, the coils at one side having a line-circuit connection and the coils at the other side having a line-circuit connection and a connection with the stylus mechanism, and circuit connections from the armature to the said line-circuit connection, substantially as and for the purpose set forth.

50. In a facsimile-telegraph, the stylus short-circuiter device, comprising the armature and contact and having the coils at opposite sides of said armature, in combination with the stylus mechanism and the line-batteries of opposite polarity, the circuit connection between said respective line-batteries and the respective stylus devices, the differential windings of the coils at one side said armature, said differential windings extending respectively to the respective line-batteries and being connected by a ground-line connection, a line-circuit connection for the contact and other coils, and a short-circuit connection between said armature and line-batteries, substantially as and for the purpose set forth.

51. In a facsimile-telegraph, a recording stylus device embodying a slidable or depressible stylus-rod, an electromagnetic operating device comprised in an electrical circuit and embodying a framework carrying the magnetic coil and provided with projecting arms and an armature supported by said arms and forming a bridge between the same, and a lever centrally connected with said armature and bearing upon said stylus-rod to depress the same.

52. In a facsimile-telegraph, a main rotary shaft carrying a stylus-carrier, a set of stylus devices arranged successively in a circular series upon said carrier, a commutator carried by said shaft and comprising two separate segmental ring sets and a continuous ring set and having intermediate segments between the main segments of the two segmental ring sets, said intermediate segments being connected in series with the continuous ring, circuit connections extending from the respective stylus devices alternately to the main segments of said two segmental ring sets, and circuit connections having contacts with each of the three ring sets of said commutator.

53. In a facsimile-telegraph, a rotary mechanism carrying a set of stylus devices successively arranged in a circular series, circuit connections successively and alternately connecting with said individual stylus devices and dividing the same into alternate separate sets, and circuit connections dividing said separate sets of stylus devices intermediately with respect to each stylus of each set.

54. In a facsimile-telegraph, stylus devices arranged in successive series, two separate circuit contact sets divided into separate contacts and arranged so that the separate contacts of one set intersect the central period of the separate contacts of the other set, said successive stylus devices being alternately connected with the separate contacts of said separate contact sets, circuit connections for said separate contact sets, and a circuit contact set divided into separate contacts corresponding in number to the total number of the separate contacts in the two stylus contact sets, the interval between the separate contacts of said third contact set being in such relative position that they intersect alternately the plane of the interval between the contacts of the respective stylus contact sets, and a separate connection for said third contact set, whereby a synchronizing impulse may be sent at a regular determined interval with respect to the position of the stylus devices, substantially as and for the purpose set forth.

55. In a facsimile-telegraph, the combination of the line-circuit, the stylus-operating mechanism, an electromagnetic synchronizing mechanism connected with said stylus-operating mechanism, an electromagnetic stop mechanism adapted to operatively engage said stylus-operating mechanism, an individual circuit comprising both said synchronizing and stop mechanisms, and means for opening and closing said individual circuit by impulses over the line-circuit.

56. In a facsimile-telegraph, the combination of the line-circuit, stylus-operating mechanism, electromagnetic synchronizing mechanism connected with said stylus-operating mechanism, electromagnetic stop mechanism adapted to operatively engage said stylus-operating mechanism, an individual circuit comprising both said synchronizing and stop mechanisms, means comprised in the line-circuit for sending relatively weak writing impulses over the same, means comprised in the line-circuit for sending relatively strong impulses over the same, and means connected with the line-circuit for opening and closing said individual circuit, said latter means being adapted to be operated only by the heavier line-circuit impulses.

57. In a facsimile-telegraph, the combination of the line-circuit, stylus-operating mechanism, electromagnetic synchronizing mechanism connected with said stylus-operating mechanism, electromagnetic stop mechanism adapted to operatively engage the stylus-operating mechanism, an individual circuit comprising both the synchronizing and stop mechanisms, a line-battery, means for dividing said battery during the sending of writing impulses whereby the latter are sent with only part of the force of the battery, means for sending the full force of the battery at intervals over the line-circuit, and means connecting said individual circuit with the line-circuit and operating to open and close said individual circuit, said latter means being adapted to be operated only by said heavy impulses.

58. In a facsimile-telegraph, the combination of the line-circuit, stylus-operating mechanism, an electromagnetic synchronizing mechanism connected with said stylus-operating mechanism, an individal circuit comprising said synchronizing mechanism, and means connected with the line-circuit and adapted to be operated by impulses over the same to open and close said individual circuit.

59. In a facsimile-telegraph, the combination of the line-circuit, stylus-operating mechanism, electromagnetic synchronizing mechanism connected with said stylus-operating mechanism, an individual circuit comprising said synchronizing mechanism, means connected with the line-circuit for opening and closing said individual circuit, a line-battery, means for short-circuiting a part of the line-battery, means for sending relatively weak writing impulses over the line during said short-circuiting, and means for sending relatively strong impulses at intervals over the line when the line-battery is not short-circuited, the individual circuit connection between the synchronizer-circuit and the line being adapted to be operated only by said heavy impulses.

60. In a facsimile-telegraph, the combination of the line-circuit, stylus-operating mechanism, electromagnetic synchronizing mechanism connected with said stylus-operating mechanism, a circuit connection between said synchronizing mechanism and the line, means for sending currents of varying and respectively of relatively weak and relatively strong force over the line, means for sending writing impulses with said relatively weak currents, and means for actuating the synchronizing mechanism only by the relatively strong currents.

61. In a facsimile-telegraph, the combination of the line-circuit, electromagnetic recording stylus devices, an individual circuit comprising said recording stylus devices, and means connected with the line-circuit for opening and closing said individual stylus-circuit by impulses of opposite polarity over the line.

62. In a facsimile-telegraph, a plurality of recording stylus devices, an individual circuit comprising said stylus devices and divided into branches connected with said respective stylus devices, relays of different polarity connected with the respective branches of said circuit and operating to open and close said branches and a commutator in connection with said branches.

63. In a facsimile-telegraph, a plurality of recording stylus devices, an individual circuit comprising said stylus devices and divided into separate branches respectively connected with the respective stylus devices, means for sending impulses of opposite polarity to the recording stylus devices, relays of different polarity and a commutator in connection with the branches of the individual circuit connecting the respective branches of said circuit and operating to open and close said branches.

64. In a facsimile-telegraph, a plurality of recording stylus devices, an individual circuit comprising said stylus devices and divided into separate branches respectively connected with the respective stylus devices, two polarized receiving-relays comprised respectively in the respective branches of said individual circuit and a line-circuit to which the said polarized receiving-relays are connected and a commutator in connection with the branches of individual circuit.

65. In a facsimile-telegraph, the combination of the line-circuit, a plurality of recording stylus devices, an individual circuit comprising said stylus devices and divided into separate branches respectively connected with the respective stylus devices, relays of opposite polarity respectively connecting said respective branches of the individual circuit with the line-circuit and a commutator in connection with the branches.

66. In a facsimile-telegraph, the combination of the line-circuit, a plurality of recording stylus devices, an individual circuit comprising said stylus devices and divided into branches respectively connected with the respectively stylus devices, relays connected with the line-circuit and with said branches of the individual circuit for making and breaking said respective branches by line impulses of opposite polarity and a commutator in connection with the branches of the individual circuit.

67. In a facsimile-telegraph, a plurality of recording stylus devices, branch circuits comprising respectively the respective stylus devices, means for sending currents of different polarity over the respective branch circuits and a commutator in connection with the branch circuits and relays connected respectively with the branch circuits and being of opposite polarity and arranged to receive the impulses sent to the recording stylus device.

68. In a facsimile-telegraph, a plurality of stylus devices respectively having line-circuit connections of different polarity.

69. In a facsimile-telegraph, stylus devices arranged in successive series and respectively having line-circuit connections of different polarity, the differentiated-polarity connections being alternated with respect to the successive set of stylus devices, whereby when a plurality of said stylus devices are simultaneously in operative position or relation they will be of different polarity.

70. In a facsimile-telegraph, recording stylus devices arranged in successive series, circuit connections for said recording stylus devices divided into two separate sets which are respectively divided into separate connections, said stylus devices being alternately and successively connected to the respective separate circuit connections of said two separate connection sets and said stylus devices being also connected in series, an individual circuit comprising a connection with said series-circuit connection of the stylus devices and having separate branch connections with said separate connection sets, in combination with the line-circuit, and means connected with said separate branches of said individual circuit and with the line-circuit whereby said branches are operated by currents of different polarity.

71. In a facsimile-telegraph, stylus devices respectively having line-circuit connections of different polarity the differentiated-polarity connections being alternated with respect to said stylus devices.

72. In a facsimile-telegraph, a plurality of stylus devices individually connected with circuits having current sources of opposite polarity, and means for making and breaking said circuits, whereby when one of said circuits is broken by insulation of its stylus device an impulse of reversed polarity is sent through the circuit controlled by the other stylus device.

73. In a facsimile-telegraph, stylus-operating mechanism, an electromagnetic stop mechanism having an operative engagement with said stylus-operating mechanism, an individual circuit comprising said stop mechanism, the line-circuit, and means for making and breaking said individual circuit by impulses of predetermined force over the line-circuit.

74. In a facsimile-telegraph, a receiving or recording machine comprising stylus mechanism, means for operating the same, synchronizing mechanism connected with said stylus-operating mechanism, a stop mechanism having an operative connection with said stylus-operating mechanism, said machine embodying circuit connection comprising said synchronizing and stop mechanisms, and a local circuit comprising the stylus mechanism, in combination with the line-circuit, and means for opening and closing said local circuits by impulses over the line-circuit.

75. In a facsimile-telegraph, a recording-machine comprising stylus mechanism, means for operating the same, synchronizing means connected with said stylus-operating mechanism, a stop mechanism having an operative connection with said stylus-operating mechanism, said machine embodying local-circuit connection comprising the synchronizing and stop mechanisms and a local circuit comprising the stylus mechanism and divided into branches respectively connected with respective stylus devices, in combination with the line-circuit, means for opening and closing the local-circuit connection of the synchronizing and stop mechanism by impulses over the line, and polarized means connected with the respective branches of the local stylus-circuit for opening and closing said branches by line impulses of opposite polarity.

76. In a facsimile-telegraph, stylus mechanism, and a local circuit comprising said stylus mechanism, in combination with the line-circuit, and means for opening and closing said local circuit by impulses over the line-circuit.

77. In a facsimile-telegraph, the combination of a transmitting-machine, stylus devices comprised therein, individual-circuit connections respectively connected with said stylus devices and respectively having current sources of opposite polarity, the line-circuit connected with said stylus-circuits, means for sending impulses of opposite polarity to the line by action of said stylus devices, the recording-machine, recording-stylus mechanism comprised therein, branch-circuit connections respectively comprising said stylus devices, and polarized means comprised in said branch circuits and operating respectively to open and close the same by action of the line impulses of opposite polarity.

78. In a facsimile-telegraph, the combination of a transmitting-machine, a plurality of stylus devices comprised therein, circuit connections of opposite polarity respectively connected to the respective stylus devices, the line-circuit connected with said stylus-circuit connections, the recording-machine, a plurality of recording-styluses comprised therein, and means for respectively and relatively actuating said recording-styluses by line impulses of opposite polarity.

79. In a facsimile-telegraph, the combination of a transmitting-machine, a plurality of stylus devices comprised therein, means for sending impulses of opposite polarity over the line by action of said respective stylus devices, a recording-machine, a plurality of recording-styluses comprised therein, means for respectively actuating said recording stylus devices by line impulses of opposite polarity, and the line-circuit connecting said machines.

80. In a facsimile-telegraph, the combination of a plurality of individual machines comprising stylus mechanism and means for operating the same, electromagnetic synchronizing mechanisms respectively connected with the stylus-operating mechanism of the respective machines, individual circuits respectively comprising the synchronizing mechanism of the respective machines, a line-circuit related to all of said machines, means for sending currents of variable force over the line-circuit, means for actuating the stylus mechanisms of the respective machines by impulses over the line, and means for opening and closing said individual circuits of the respective machines simultaneously only by line-currents of variable force with relation to the ordinary currents for actuation of the stylus mechanisms.

81. In a facsimile-telegraph, the combination of a plurality of individual machines comprising stylus mechanism and means for operating the same, electromagnetic synchronizing mechanisms respectively connected with the stylus-operating mechanisms of the respective machines, electromagnetic stop mechanisms respectively having an operative connection with the stylus-operating mechanisms of the respective machines, local-circuit connections respectively comprising the synchronizing and stop mechanisms of the respective machines, the line-circuit related to all of said machines, means for actuating the stylus mechanisms of the respective machines by impulses of predetermined force over the line-circuit, and means for opening and closing the respective local synchronizing and stop circuits of the respective machines by impulses over the line of variable force with respect to the writing impulses.

82. In a facsimile-telegraph, the combination of a plurality of individual machines comprising stylus mechanism and means for operating the same and synchronizing mechanism, the line-circuit related to all of said machines, means for sending corresponding current impulses of varying force over the line-circuit, means for actuating the stylus mechanisms by the line currents or impulses of one force, and means for actuating the synchronizing mechanisms by the line currents or impulses of another force.

83. In a facsimile-telegraph, a plurality of stylus devices, circuit connections respectively of opposite polarity extending respectively and alternately to the respective stylus devices, said respective circuit connections being connected together and connected with the line-circuit, and the line-circuit connection adapted to be completed through said stylus devices, means for opening and closing the circuit connections of the respective styluses and means whereby the opening of one stylus-circuit sends a current of opposite polarity from the other stylus-circuit over the line.

84. In a facsimile-telegraph, a plurality of stylus devices, line-batteries of opposite polarity, circuit connections extending respectively from the line-batteries and respectively and alternately to the respective stylus devices, circuit connections with said line-batteries, said latter circuit connections being connected together and in connection with the line-circuit, and the line-circuit connection adapted to be completed through said stylus devices, means for opening and closing the circuit connections of the respective styluses and means whereby the opening of one stylus-circuit sends a current of opposite polarity from the other stylus-circuit over the line.

85. In a facsimile-telegraph, a plurality of stylus devices, circuit connections respectively of opposite polarity extending respectively and alternately to the respective stylus devices, said circuit connections being reversely coiled and connected together and connected with the line-circuit, and the line-circuit connection adapted to be completed through said stylus devices.

86. In a facsimile-telegraph, a plurality of stylus devices, line-batteries of opposite polarity, circuit connections extending respectively from said line-batteries respectively and alternately to the respective stylus devices, circuit connections extending respectively from said line-batteries and reversely coiled and connected together and connected with the line-circuit, and the line-circuit connection adapted to be completed through said stylus devices.

87. In a facsimile-telegraph, a plurality of stylus devices, circuit connections respectively of opposite polarity extending respectively and alternately to said respective stylus devices, and a line-circuit connection connected with both of said respective circuit connections of opposite polarity, means for opening and closing the circuit connections of the respective styluses and means whereby the opening of one stylus-circuit sends a current of opposite polarity from the other stylus-circuit over the line.

88. In a facsimile-telegraph, a plurality of stylus devices, a line-circuit connection for said stylus devices, said line-circuit connection being adapted to be completed through the foil-paper contacts, line-batteries respectively of opposite polarity, circuit connections respectively extending from said line-batteries respectively and alternately to said respective stylus devices, and line-circuit connections extending from said respective batteries and connected together and connected with the line-circuit.

89. In a facsimile-telegraph, a plurality of stylus devices, a line-circuit connection for the foil-paper contact of said stylus devices, two line-batteries of opposite polarity, the wires 87 and 88 extending respectively from said line-batteries, means for completing circuit connection between said respective wires and the respective stylus devices in an alternate manner, and the extension of the battery-wires 87 and 88, said extensions being connected together and connected with the line-circuit.

90. In a facsimile-telegraph, stylus mechanism, a line-circuit connection therewith, a source of electrical energy connected with the said line-circuit connection, a short circuit arranged to short-circuit a portion of the current of the said line-circuit and means for opening and closing said short circuit at intervals with respect to the position of the stylus mechanism.

91. In a facsimile-telegraph, stylus mechanism, a line-circuit connection therewith, a line-battery comprised in said line-circuit connection, a short circuit arranged to short-circuit a part of said line-battery, and means for opening and closing said short circuit at intervals with respect to the position of the stylus mechanism.

92. In a facsimile-telegraph, a plurality of stylus devices, line-circuit connections respectively of opposite polarity extending respectively and alternately to said respective stylus devices, means for short-circuiting a part of the current passing over said respective line-circuit connections, and means for opening and closing said short-circuiting means at intervals with respect to the position of the stylus devices.

93. In a facsimile-telegraph, a plurality of stylus devices, two line-batteries of opposite polarity, circuit connections respectively extending through said line-batteries and extending respectively and alternately to the respective stylus devices, short circuits respectively around part of said line-batteries, and means for opening and closing said short circuits at intervals with relation to the position of the stylus devices.

94. In a facsimile-telegraph, the combination, with a line-circuit connection including stylus mechanism and a line-battery or source of electrical impulse, of a short circuit thrown around part of said battery or source of electrical impulse, and means for opening said short circuit at intervals with respect to the position of the stylus mechanism.

95. In a facsimile-telegraph, a plurality of stylus devices, a line-circuit connection for the foil-paper contact of said stylus devices, two line-batteries respectively of opposite polarity, line-circuit connections respectively extending through said line-batteries, means for respectively and alternately connecting said respective line-circuit connections with the respective stylus devices, said respective line-circuit connections being reversely coiled and connected together and connected with the line-circuit, short circuits respectively thrown around part of said respective line-batteries, and means for opening and closing said short circuits at intervals with respect to the position of the stylus devices.

96. In a facsimile-telegraph transmitting and recording stylus mechanism, a single line-circuit including the recording mechanism and normally closed; a normally closed short circuit around the line-battery of the line-circuit and including the transmitting mechanism and means for opening and closing the said short circuit.

97. In a facsimile-telegraph, a plurality of stylus devices, line-circuit connections respectively of opposite polarity extending respectively and alternately to the respective stylus devices, an independent line-circuit connection, a short-circuit connection with said independent circuit connection, and means for opening and closing said short-circuit connection at intervals with respect to the position of the stylus devices.

98. In a facsimile-telegraph, a plurality of stylus devices, line-circuit connections respectively of opposite polarity and extending respectively and alternately to the respective stylus devices, said respective line-circuit connections being reversely coiled and connected together and connected with the line-circuit, an independent line-circuit connection, a short-circuit connection between said independent connection and the stylus line-circuit connections, and means for opening and closing said short-circuit connection.

99. In a facsimile-telegraph, a plurality of stylus devices, line-circuit connections respectively of opposite polarity extending respectively and alternately to the respective stylus devices, line-batteries or sources of electrical impulse connected with said respective line-circuit connections, the latter being reversely coiled beyond said batteries and connected together and with the line-circuit, an independent line-circuit connection, a short-circuit connection extending between said independent connection and the stylus-circuit connections, and means for opening and closing said short-circuit connection.

100. In a facsimile-telegraph, a plurality of stylus devices, two line-batteries respectively of opposite polarity, the line-circuit connecting-wires 87 and 88 respectively extending through said batteries, means for respectively and alternately connecting said line-circuit connections with the respective stylus devices, said line-circuit connections 87 and 88 being reversely coiled and connected together and connected with the line-circuit, the independent line-circuit connecting-wire 297, the short-circuit connecting-wire 89, short-circuiting means for opening and closing the circuit connection between the wires 297 and 89, and means for opening and closing a short-circuit connection between the wire 89 and the stylus line-circuit connections.

101. In a facsimile-telegraph, a plurality of stylus devices, line-batteries respectively of opposite polarity, line-circuit connections, 87 and 88, respectively passing through said respective line-batteries, means for respectively and alternately connecting said line-circuit connections 87 and 88 with the respective stylus devices, said line-circuit connections 87 and 88 being reversely coiled and connected together and connected with the line-circuit, short-circuit connections respectively thrown around a portion of said line-batteries, means for opening and closing said short circuits at intervals with relation to the position of the stylus devices, an independent line-circuit connection, 297, a short-circuit connection, 89, means for opening and closing said short-circuit connection between the connections 297 and 89, and means for opening and closing a short-circuit connection between the connection 89 and the stylus line-circuit connections at intervals with respect to the position of the stylus devices.

102. In a facsimile-telegraph, a plurality of recording stylus devices, a line-circuit connection with the foil-paper contact for said stylus devices, line-circuit connections respectively of opposite polarity and extending respectively and alternately to the respective stylus devices, said line-circuit connections being connected together, an independent line-circuit connection with the line-circuit connection for the foil-paper contact, a short-circuit connection, 89, extending to the said stylus line-circuit connections, and means for opening and closing the circuit connection between said short-circuit connection and the independent line-circuit connection.

103. In a facsimile-telegraph, a plurality of recording stylus devices, a line-circuit connection for the foil-paper stylus-contact, line-circuit connections respectively of opposite polarity and extending respectively and alternately to the respective stylus devices, said stylus line-circuit connections being connected together, an independent line-circuit connection 297 extending to the line-circuit connection for the foil-paper contact, a short-circuit connection 89, means for completing a short circuit between said short-circuit connection 89 and both the stylus line-circuit connections, and means for opening and closing a circuit connection between said short-circuit connection 89 and the independent line-circuit connection 297.

104. In a facsimile-telegraph, a plurality of stylus devices, a line-circuit connection for the foil-paper stylus-contact, line-circuit connections respectively of opposite polarity extending respectively and alternately to the respective stylus devices and connected together, a short-circuit connection extending from said stylus line-circuit connections, an independent circuit connection extending between said short-circuit connection and the circuit connection for the foil-paper contact, and means for opening and closing said independent short circuit.

105. In a facsimile-telegraph, a plurality of stylus devices, a line-circuit connection for the foil-paper stylus-contact, line-circuit connections respectively of opposite polarity extending respectively and alternately to the respective stylus devices, said stylus line-circuit connections being reversely wound and connected together and connected with the line-circuit, a short-circuit connection extending from said stylus line-circuit connections, an independent circuit connection extending between said short-circuit connection and the circuit connection for the foil-paper contact, and means for opening and closing said independent short-circuit connection.

106. In a facsimile-telegraph, line-circuit connections of opposite polarity extending respectively from stylus devices, said stylus line-circuit connections being reversely coiled and connected together, and a line-circuit connection for the foil-paper stylus-contact, in combination with an independent line-circuit connection extending from the line-circuit connection for the foil-paper contact and directly coiled, a vibrating armature interposed between said differential and direct coils, and a short-circuit connection between said stylus line-circuit connections and said armature.

107. In a facsimile-telegraph, the stylus circuit-wires 87 and 88, the reversely-wound coils of said wires, the connection between said wires and the line-circuit wire extending therefrom, the independent line-circuit-connection wire 297 and the direct coils thereof, the short-circuit-connection wire 89, and the vibrating armature interposed between said differential and direct coils and connected with the wire 89, substantially as and for the purpose set forth.

108. In a facsimile-telegraph, stylus mechanism, a line-circuit battery or source of electrical impulse, a line-circuit connection connecting said battery and the stylus mechanism, means for short-circuiting a part of said battery during the sending of writing impulses, and means for opening said short circuit during the sending of synchronizing impulses.

109. In a facsimile-telegraph, a plurality of stylus devices, line-batteries or sources of electrical impulse respectively of opposite polarity, circuit connections respectively connecting said line-batteries respectively and alternately with the respective stylus devices, means for short-circuiting a portion of said line-batteries during the sending of writing impulses, means for opening said short circuits during the sending of synchronizing impulses, and means for sending both writing and synchronizing impulses at the same time.

110. In a facsimile-telegraph, a plurality of stylus devices, line-circuit connections respectively of opposite polarity extending respectively and alternately to the respective stylus devices, means for sending writing impulses of reversed polarity through said stylus devices, means for sending synchronizing impulses of corresponding polarity through said stylus devices, and independent circuit connections for sending synchronizing impulses of reversed polarity simultaneously with the sending of writing impulses, substantially as and for the purpose set forth.

111. In a facsimile-telegraph, a plurality of stylus devices, reversed polarity line-circuit connections extending respectively to said stylus devices, means for sending reversed polarity writing impulses independently of the synchronizing impulses, means for sending synchronizing impulses independently of the writing impulses, and means for simultaneously sending synchronizing and writing impulses.

112. In a facsimile-telegraph, a plurality of stylus devices, reversed polarity circuit connections extending respectively to said stylus devices, means for sending reversed polarity writing impulses through the styluses independently of the synchronizing impulses, means for sending synchronizing impulses of corresponding polarity through the stylus devices independently of the writing impulses, and means for simultaneously sending writing and synchronizing impulses independent of the stylus devices.

113. In a facsimile-telegraph, a plurality of stylus devices, sources of electrical impulse respectively of opposite polarity, means for short-circuiting a portion of the line-current during the sending of writing impulses, means for opening said short circuit during the sending of synchronizing impulses and means for sending both writing and synchronizing impulses at the same time.

114. In a facsimile-telegraph, a plurality of transmitting-stylus devices respectively having circuit connections of opposite polarity, a foil-paper message sheet or blank, means for maintaining the foil-paper message sheet or blank in circuit connection with the plurality of stylus devices simultaneously, a line-circuit connection for said foil-paper message sheet or blank, and means for establishing a short circuit between said plurality of stylus devices and through the foil-paper message sheet or blank when said stylus devices are not in contact with insulating-ink or markings thereon.

115. In a facsimile-telegraph, a plurality of recording-stylus devices, branch circuits comprising respectively the respective stylus devices, a main-line circuit, means for sending circuits of different polarity over the main line, and means connected with the main line and with the branch circuits for receiving the said currents of different polarity and directing the same to the respective stylus devices.

116. In a facsimile-telegraph, a plurality of stylus devices connected with electric current sources of opposite polarity and means for making and breaking the connections of the said stylus devices with the said current sources, whereby when one of the styluses is disconnected an impulse of reverse polarity is sent by the other stylus device.

In testimony that I claim the foregoing as my invention I have signed my name, in presence of the subscribing witnesses, this 5th day of February, 1900.

EDWARD E. KLEINSCHMIDT.

Witnesses:
FREDK. KLEINSCHMIDT,
PERCY T. GRIFFITH.